US012779609B2

(12) United States Patent
Lin et al.

(10) Patent No.: US 12,779,609 B2
(45) Date of Patent: Nov. 3, 2026

(54) MACHINE TOOL RAPID MOTION PLANNING

(71) Applicant: FANUC CORPORATION, Yamanashi (JP)

(72) Inventors: Hsien-Chung Lin, Fremont, CA (US); Tetsuaki Kato, Fremont, CA (US)

(73) Assignee: FANUC CORPORATION, Yamanashi (JP)

( * ) Notice: Subject to any disclaimer, the term of this patent is extended or adjusted under 35 U.S.C. 154(b) by 454 days.

(21) Appl. No.: 18/491,107

(22) Filed: Oct. 20, 2023

(65) Prior Publication Data

US 2025/0128377 A1 Apr. 24, 2025

(51) Int. Cl.
*B23Q 15/12* (2006.01)

(52) U.S. Cl.
CPC .................................... *B23Q 15/12* (2013.01)

(58) Field of Classification Search
USPC .......................................................... 700/173
See application file for complete search history.

(56) References Cited

U.S. PATENT DOCUMENTS 5,204,599 A * 4/1993 Hohn ................. G05B 19/4103 700/189
5,412,300 A * 5/1995 Meyer .................... G05B 19/41 901/14
5,953,233 A * 9/1999 Higasayama ...... G05B 19/4097 318/573
6,447,223 B1 * 9/2002 Farah ..................... G05B 19/41 409/80
6,922,606 B1 * 7/2005 Yutkowitz .......... G05B 19/4103 318/560
9,897,991 B2 2/2018 Yahaba et al.
2005/0209730 A1 * 9/2005 Grund ................ G05B 19/4067 700/177
2007/0046677 A1 * 3/2007 Hong ..................... G05B 19/41 345/442
2015/0127139 A1 * 5/2015 Bolin ................. G05B 19/4065 700/173

(Continued)

OTHER PUBLICATIONS

JP_2004220435_A (Year: 2004).*

(Continued)

*Primary Examiner* — Hien D Khuu
(74) *Attorney, Agent, or Firm* — John A. Miller; Shumaker, Loop & Kendrick, LLP

(57) ABSTRACT

A method for machine tool motion control which determines a time-optimal trajectory for a multi-segment tool path motion. Start and end waypoints for each segment of the overall motion are defined, along with other conditions such as cutting feed speed. An initial motion profile for each segment is computed based on the waypoint geometry and other constraints, and motion states at the waypoints which join the segments are optimized to provide the shortest total trajectory time. The optimized waypoint states include velocities and accelerations with non-zero values. An extra waypoint may be added to the trajectory, such as for collision avoidance, and the waypoint states are again optimized for minimum total time of the complete trajectory. Heuristic and gradient descent techniques are applied for computation of the optimum waypoint state values.

20 Claims, 17 Drawing Sheets

(56) References Cited

U.S. PATENT DOCUMENTS

| | | | | |
|---|---|---|---|---|
| 2019/0391556 | A1 | 12/2019 | Kuroki | |
| 2023/0158592 | A1 * | 5/2023 | Nilsson | B23B 25/02 82/1.11 |

OTHER PUBLICATIONS

KR_101570359_B1 (Year: 2015).*
Nishida et al. "Machining Time Reduction by Tool Path Modification", Int. J. of Automation Technology, 2020, p. 459-466. (Year: 2020).*
Amersdorfer et al. "Equidistant Tool Path and Cartesian Trajectory Planning for Robotic Machining of Curved Freeform Surfaces", IEEE, 2022, p. 3311-3323. (Year: 2022).*
JP_2012152884_A (Year: 2012).*
WO_2010134532_A1 (Year: 2010).*
CN_113189939_A (Year: 2021).*
CN_104615084_B (Year: 2017).*
CA_2747239_A1 (Year: 2006).*
WO_02088855_A1 (Year: 2002).*
Beul, Marius, and Sven Behnke. "Analytical time-optimal trajectory generation and control for multirotors." 2016 International Conference on Unmanned Aircraft Systems (ICUAS), Arlington, VA, UA, Jun. 2016, pp. 1-10.
Berscheid, Lars, and Torsten Kröger. "Jerk-limited real-time trajectory generation with arbitrary target states." Karlsruhe Institute of Technology (KIT), Germany, 23, Jun. 2021, https://github.com/pantor/ruckig.

* cited by examiner

MACHINE TOOL RAPID MOTION PLANNING

BACKGROUND

Field

The present disclosure relates generally to the field of machine tool motion control and, more particularly, to a method for machine tool motion planning which determines a time-optimal trajectory for a multi-segment motion, where motion states at intermediate waypoints which join the segments are optimized to provide the shortest total time, and where an extra waypoint may be added such as for collision avoidance and the waypoint states are again optimized for minimum total time of the complete trajectory.

Discussion of the Related Art

It is known in the art to use computer-controlled devices to perform machining operations, such as drilling and milling, on parts. In some applications, computer numerical controlled (CNC) machines are used which move a tool along a path in three dimensions while the tool maintains a fixed spatial orientation. In other applications, a multi-axis industrial robot is fitted with a machining head, and the robot can move the tool along a spatial path while also controlling the tool orientation to any desired value.

Regardless of what type of machine tool or robot is used to perform the machining operation, a tool path trajectory and corresponding velocity profile must be computed. The tool path trajectory includes both machining steps (when the tool is cutting material from the workpiece, such as drilling a hole or milling) and "air cut" movement steps (where, before or after a machining step, the tool is moved through air to a point at the beginning of the next machining step).

The computed tool path trajectory must of course accurately perform the desired machining steps on the workpiece (i.e., provide the desired shape of the completed workpiece, with holes in the correct locations, etc.), and must also adhere to constraints such as mechanical limits of the machine, and a specified feed speed when drilling or milling.

In addition, it is desirable to compute the tool path trajectory and velocity profile which provides the fastest possible cycle time for the overall machining operation, in order to maximize machine productivity. And finally, it is imperative to ensure that the tool path trajectory is collision-free—that is, that the tool and the machine avoid collisions with the workpiece itself or with a fixture or any other obstacle in the workspace.

Techniques are known in the art which, given specified start and goal locations, can compute a trajectory and corresponding velocity profile which optimizes cycle time. However, these techniques cannot optimization the total cycle time for a multi-segment trajectory (such as an air cut segment followed by a cutting segment and then another air cut segment). Furthermore, some trajectory computation techniques cannot accommodate collision avoidance determinations in the trajectory calculation.

Other techniques exist which can accommodate collision avoidance determinations in the trajectory calculation, but these existing techniques do not optimize cycle time. For example, one known method monitors for collisions in real time and, if an imminent collision is detected, stops the machine in order to prevent the collision. Another known method requires computation of multiple tool path trajectories in advance, and selects one of the predefined trajectories based on the obstacle environment for a particular operation. Still another method uses an imaging system to detect potential collisions in real time and adjusts the trajectory accordingly, but cannot optimize cycle time of the operation while doing so.

In light of the circumstances described above, there is a need for an improved machine tool motion planning method which can minimize cycle time in a multi-segment trajectory, and ensure a collision-free tool path while meeting other geometric and kinematic constraints of the system. An improved machine tool programming method embodying the time-optimal trajectory computation is also needed.

SUMMARY

The present disclosure describes a method for machine tool motion control which determines a time-optimal trajectory for a multi-segment tool path motion. Start and end waypoints for each segment of the overall motion are defined, along with other conditions such as cutting feed speed. An initial motion profile for each segment is computed based on the waypoint geometry and other constraints, and motion states at the waypoints which join the segments are optimized to provide the shortest total trajectory time. The optimized waypoint states include velocities and accelerations with non-zero values. An extra waypoint may be added to the trajectory, such as for collision avoidance, and the waypoint states are again optimized for minimum total time of the complete trajectory. Heuristic and gradient descent techniques are applied for computation of the optimum waypoint state values.

Additional features of the presently disclosed systems and methods will become apparent from the following description and appended claims, taken in conjunction with the accompanying drawings.

DETAILED DESCRIPTION OF THE EMBODIMENTS

The following discussion of the embodiments of the disclosure directed to time-optimal machine tool motion planning and programming is merely exemplary in nature, and is in no way intended to limit the disclosed devices and techniques or their applications or uses.

Figure 1:
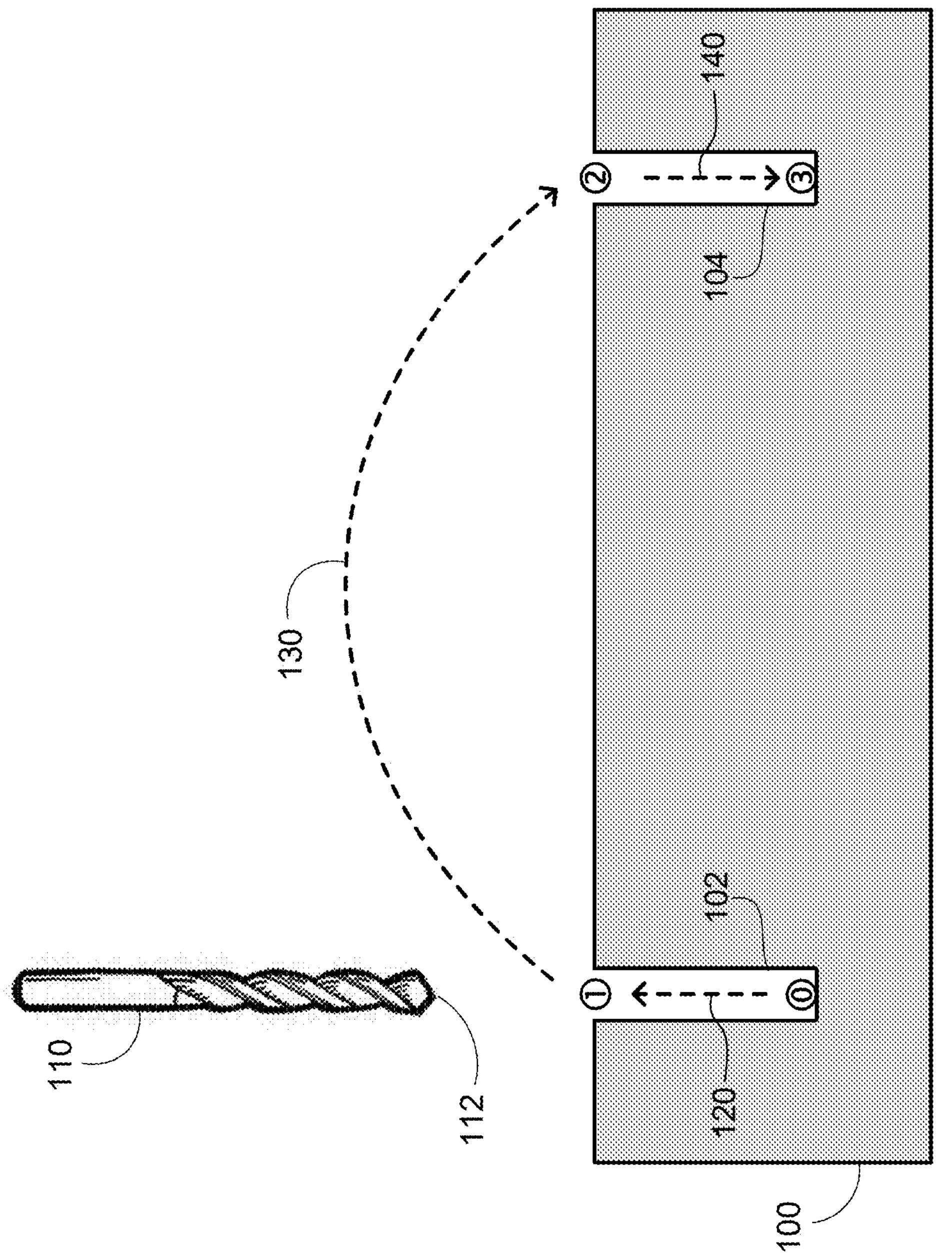
FIG. 1 is a cross-sectional illustration of a workpiece machining operation and the basic concepts involved in motion planning for the operation.

FIG. 1 is a cross-sectional illustration of a workpiece machining operation and the basic concepts involved in motion planning for the operation. FIG. 1 is provided as a basis for describing the type of machining operation which is the subject of the present disclosure. A workpiece 100 is typically held in a fixed position by clamps or fixtures, and the workpiece 100 is machined by a tool 110 having a tip 112. The tool 110, which could be a drill or a mill for example, is operated by a programmatically controlled machine (not shown)—which could be a CNC machine or a multi-axis industrial robot. In the example shown in FIG. 1 and discussed throughout the present disclosure, the tool 110 has a fixed orientation (i.e., always vertical as seen in FIG. 1; does not tilt).

The machining operation depicted in FIG. 1 is drilling two holes—a hole 102 and a hole 104—into the workpiece 100. The holes 102 and 104 are shown as already drilled for illustration purposes. The tool 110 is first positioned approximately as shown in FIG. 1, moved vertically downward until it contacts the workpiece 100, and the hole 102 is drilled in a known manner.

The remaining steps of the operation—moving the tool 110 out of the hole 102, moving the tool 110 into position at the top of and then drilling the hole 104—are the subject of the present disclosure. The first step of this operation is moving the tip 112 of the tool 110 from a waypoint ⓪ at the bottom of the hole 102 upward along a path 120 to a waypoint ① at the top of the hole 102. The tool 110 can be moved upward as quickly as possible (e.g., maximum acceleration until a maximum velocity is reached) in the first step because no material is being cut.

The second step of the operation is to move the tip 112 of the tool 110 along a path 130 (shown with a generic shape) from the waypoint ① at the top of the hole 102 to a waypoint ② at the top of the hole 104. Because the tool 110 is moving through air, this repositioning step can also be performed as quickly as possible (adhering to machine mechanical limits). Techniques for computing a time-optimal trajectory for the path 130 are discussed below. The last step of the operation is to drill the hole 104 by moving the tip 112 of the tool 110 from the waypoint ② at the top of the hole 104 downward along a path 140 to a waypoint 3 at the bottom of the hole 104. While drilling the hole 104, the tool 110 cannot be moved faster than a prescribed feed speed, based on the material of the workpiece 100 and other factors, as known in the art.

More than two holes could be drilled in the workpiece 100, in which case the tool path motions discussed above would be repeated successively for each hole. FIG. 1 illustrates a simple two-dimensional tool motion, but motions in the third dimension ("into and out of the page") may be included, as shown in a later figure and discussed below. Additionally, FIG. 1 depicts a drilling operation with the tool 110 being a drill bit. It is to be understood that the machine tool motion planning techniques of the present disclosure are equally applicable to other types of machining operations-such as milling with an end mill or a side mill, etc. As such, other types of features (besides holes) could be machined.

Figure 2:
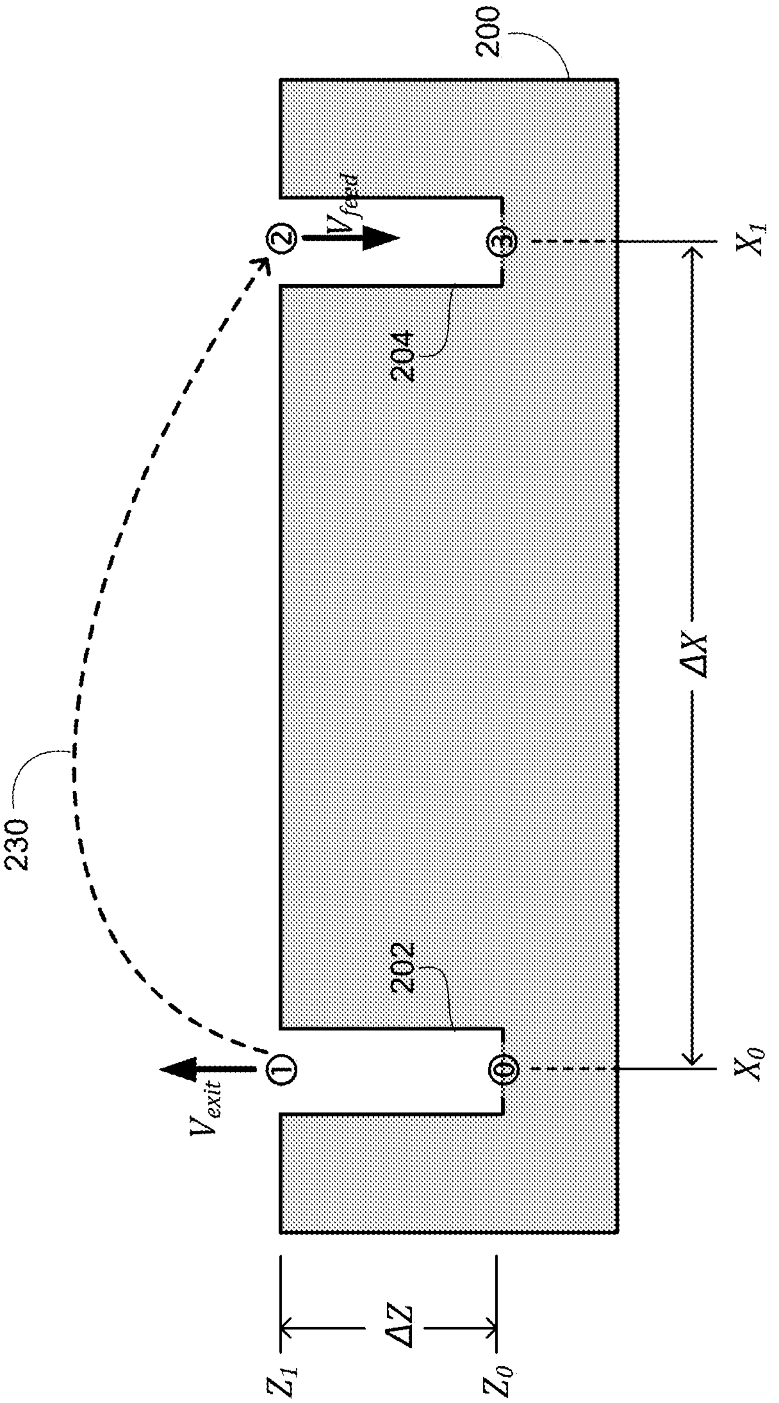
FIG. 2 is a cross-sectional illustration of a workpiece and a machining operation involving two holes as in FIG. 1, and depicting a time-optimal trajectory for moving the tool from the first hole to the second hole.

FIG. 2 is a cross-sectional illustration of a workpiece and a machining operation involving two holes as in FIG. 1, and depicting a time-optimal trajectory for moving the tool from the first hole to the second hole. The discussion of FIG. 2 provides an explanation of the computation of the time-optimal trajectory in the absence of any obstacles, including the waypoints and their corresponding state conditions. A workpiece 200 corresponds generally with the workpiece 100 of FIG. 1. In FIG. 2, the machining operation involves drilling or boring two holes, including a hole 202 and a hole 204 using a tool (not shown). After machining the hole 202, the objective is to reposition the tool as quickly as possible and machine the hole 204. This involves moving the tip of the tool vertically upward out of the hole 202, moving the tip of the tool along a time-optimal trajectory 230, and then machining the hole 204. The waypoints ⓪, ①, ② and ③ have the same definitions as in FIG. 1.

The machine tool or robot performing the machining operation has mechanical constraints and other conditions defined as follows. $V_{feed}$ is the speed in the vertical (z) direction which is used while the tool is cutting material; i.e., machining the hole 204. $V_{max}$ is the maximum allowable speed/velocity of the tool in either the vertical (z) or horizontal (x) direction while the tool is moving through air; i.e., when repositioning, not machining. $A_{max}$ is the maximum allowable acceleration of the tool in either the vertical (z) or horizontal (x) direction while the tool is repositioning. A maximum jerk $J_{max}$ (the rate of change of acceleration) is typically also defined for machine tools.

In order to minimize the cycle time of the machining operation, the following boundary conditions are applied to the steps. In the first step (from ⓪ to ①, the x position is held fixed while the tool is moved upward in the z direction. This upward motion in the first step begins at rest, applies $J_{max}$ until $A_{max}$ is reached, and continues at $A_{max}$ until $V_{max}$ is reached or until the upward velocity needs to begin being reduced for compatibility with the second step (the trajectory 230). The vertical velocity upon reaching point ① is $V_{exit}$, which could be less than or equal to $V_{max}$ depending on the distances ΔZ and ΔX and other factors. The value of $V_{exit}$ and how it relates to the overall time-optimal multi-segment trajectory is discussed later.

As discussed above, the first step in the machining operation is straightforward—upward acceleration to $V_{exit}$, which is possibly capped at velocity $V_{max}$. The third step is also very straightforward-constant downward motion at the velocity $V_{feed}$. The second step is more complicated—with interdependent x and z motions—resulting in the trajectory 230 illustrated in FIG. 2. The motion in the second step is also dependent upon $V_{exit}$, which creates an interdependence on the motion of the first step. There are several different scenarios for the computation of the tool path motions depicted in FIG. 2. These scenarios depend on the relationships between the distances that need to be traveled (ΔZ and ΔX) and the respective maximum allowable velocities and accelerations ($V_{max}$ and $A_{max}$), in addition to maximum allowable jerk. Following is a discussion of a technique for calculating the time-optimal motion profile for the trajectory 230.

In the second step (the trajectory 230 from ① to ②), an x axis "point-to-point" move is performed as fast as possible across the distance ΔX with $V_{max}$, $A_{max}$ and $J_{max}$ as constraints. The point-to-point move involves a starting velocity of zero (in the x direction in this case), and then includes the following seven phases of jerk-bound motion:

I. apply $J_{max}$ until $A_{max}$ is reached
II. continue at $A_{max}$ until approaching $V_{max}$
III. reduce acceleration at $-J_{max}$ until A=0 is reached at $V_{max}$
IV. continue at $V_{max}$ with no acceleration or jerk
V. apply $-J_{max}$ to increase negative acceleration until $-A_{max}$ is reached
VI. continue at $-A_{max}$ until approaching V=0
VII. apply $J_{max}$ to reduce negative acceleration until A=0 and V=0 are reached at destination position (waypoint ②)

Figure 3:
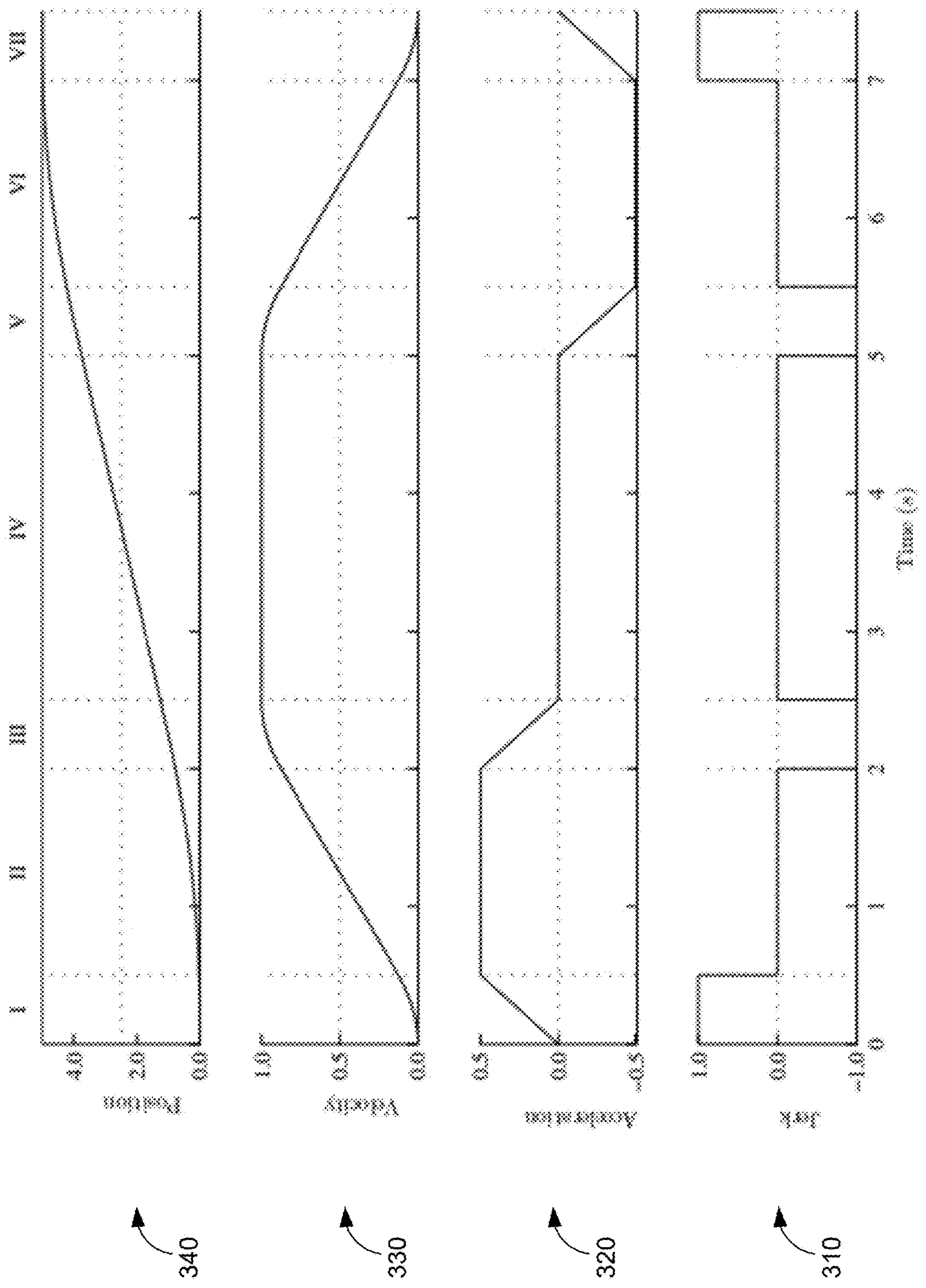
FIGURE 3 (Prior Art)
FIG. 3 includes graphs of position, velocity, acceleration and jerk versus time for a jerk-bound motion profile as described in the outline above, and as known in the art.

FIG. 3 includes graphs of position, velocity, acceleration and jerk versus time for a jerk-bound motion profile as described in the outline above. The seven phases of the motion profile, from the outline above, are labeled at the top of FIG. 3. A jerk graph 310 shows the jerk starting (in phase I) at $J_{max}$, dropping to zero, dropping further to $-J_{max}$, returning to zero, dropping again to $-J_{max}$, returning again to zero, and finally increasing (in phase VII) to $J_{max}$. A corresponding acceleration graph 320 shows the acceleration starting at zero and ramping up in phase I to $A_{max}$, continuing at $A_{max}$, ramping down to zero, continuing at zero, ramping down further to $-A_{max}$, continuing at $-A_{max}$, and ramping back up to zero in phase VII. A corresponding velocity graph 330 shows the velocity starting at zero, increasing in phases I-III to level off at $V_{max}$, continuing at $V_{max}$, and decreasing in phases V-VII back to zero. A corresponding position graph 340 shows the position (e.g., the x position for the move from waypoint ①-② in FIG. 2) starting at zero and increasing in an "S" shape until reaching an end position which corresponds with the distance ΔX of FIG. 2.

The position, velocity and acceleration for each of the seven phases can be defined using known equations of motion. For example, an equation $a_1=a_0+t_1 \cdot J_{max}$ defines the acceleration at the end of phase I ($a_1$) as a function of the initial acceleration ($a_0$), a time duration of phase I ($t_1$) and the maximum jerk ($J_{max}$). Similarly, a velocity at the end of phase I can be defined as a function of the initial velocity, the initial acceleration, the maximum jerk and the time duration of phase I (linearly with acceleration and squared with jerk). Continuing in this manner, the resulting set of polynomials includes 21 equations (seven each for position, velocity and acceleration) and 31 variables (eight for position [$p_0$-$p_7$]; eight for velocity [$v_0$-$v_7$]; eight for acceleration [$a_0$-$a_7$]; and seven for time [$t_1$-$t_7$]). Many boundary conditions can be applied to eliminate the excess number of variables relative to equations. For example, in the example described above and shown in FIG. 3, the initial acceleration ($a_0$) is known to be zero. Also, the final velocity ($v_7$) is known to be zero, and the final position ($p_7$) is known to be the distance ΔX.

When all of the boundary conditions are applied as explained above, a system of 21 equations and 21 unknowns remains, which can be solved. This results in values for all of the positions, velocities and accelerations at the beginning and end of each phase, and also the time duration of each phase (that is, the values of $t_1$-$t_7$). When the values of time durations of the seven phases are added together ($t_1$+ . . . +$t_7$), this reveals the total time of the jerk-bound minimum-time motion profile. For the trajectory 230 of FIG. 2, this total time corresponds to the time duration of the x axis motion from waypoint ①-②. During this time, the z axis velocity is reduced from its value at waypoint ① ($V_{exit}$, which is less than or equal to $V_{max}$) to its required value at waypoint ② ($-V_{feed}$). The acceleration required to cause this change in the z axis velocity is readily calculated given the time duration calculated from the x axis motion.

Returning to FIG. 2—in the third step (from ② to ③), the x position is held fixed while the tool is moved downward in the z direction at the speed of $-V_{feed}$ to machine the hole 204. Note that at the end of the second step (the trajectory 230), the velocity in the x direction is required to be zero, and the velocity in the z direction is required to be $-V_{feed}$. These boundary conditions are enforced during the optimization of the waypoint states in the multi-segment trajectory. This optimization is discussed below.

Table 1 below summarizes the states which are specified at each of the waypoints ⓪, ①, ② and ③ for the 3-step machining (drilling) operation depicted in FIG. 2 and described above. For each waypoint, the x axis and z axis position and velocity which must be met are defined in the table. The only unknown value in Table 1 is the vertical velocity at waypoint ① ($V_{exit}$). The value of $V_{exit}$ will be determined in a manner discussed below.

TABLE 1

| | | | | | | | | |
|---|---|---|---|---|---|---|---|---|
| | Step 2 | | | | | | | |
| | Step 1 | | | | Step 3 | | | |
| Waypoint | ⓪ | | ① | | ② | | ③ | |
| State | pos. | vel. | pos. | vel. | pos. | vel. | pos. | vel. |
| x axis | $X_0$ | 0 | $X_0$ | 0 | $X_1$ | 0 | $X_1$ | 0 |
| z axis | $Z_0$ | 0 | $Z_1$ | $V_{exit}$ | $Z_1$ | $-V_{feed}$ | $Z_0$ | 0 |

As mentioned above and shown in Table 1, the only unknown waypoint state for the 3-step motion of FIG. 2 is the vertical velocity at waypoint ① ($V_{exit}$). Intuitively, it may seem that $V_{exit}$ should always be equal to $V_{max}$. However, this is often not the case. For example, if the height (ΔZ) of the hole 202 is very small, a maximum acceleration motion will not reach a velocity of $V_{max}$. A more interesting case arises when the exit velocity $V_{exit}$ affects the time required to traverse the trajectory 230 of step 2. This type of interdependency means that a truly time-optimal trajectory for a multi-segment motion can only be computed by calculating the motions of all of the segments and optimizing the states of the intermediate waypoints to minimize overall time.

Still referring to FIG. 2, consider a geometry where the hole 202 is deep and the distance ΔX is short. In this case, if the exit velocity $V_{exit}$ is equal to $V_{max}$, the vertical deceleration in step 2 (from waypoint ①-②) will take more time than the horizontal translation of step 2. This means that step 2 could be completed more quickly if at the end of step 2 the exit velocity $V_{exit}$ is less than $V_{max}$. This in turn means that the motion of step 1 is no longer a simple case of acceleration to $V_{max}$, but rather is a vertical acceleration, leveling off of velocity possibly at $V_{max}$, and then a deceleration to an exit velocity of $V_{exit}$. This then becomes another example of the seven-phase jerk-bound motion profile described above. Furthermore, the exit velocity $V_{exit}$ is now an unknown state for both step 1 and the vertical calculation portion of step 2.

The example described above illustrates that the time-optimal trajectory depends on the relative values of the geometry properties (ΔX and ΔZ) and their relationship with the mechanical limits of the machine tool ($V_{max}$, $A_{max}$ and $J_{max}$), and in general can only be determined by simultaneously calculating all steps of the multi-step motion and optimizing the states of the common waypoints.

The complexities and interdependencies of trajectory calculation, even for simple cases like the example shown in FIG. 2, have traditionally been overlooked. This is because conventional multi-step motion planning for machine tools (such as 3-axis mills and articulated robots) requires the tool to stop between steps. This is a very simple solution from a programming standpoint, but it adds time to the completion of the multi-step machining operation. This is discussed further below.

Following is a step-by-step discussion of the tool motion for the 3-step machining operation illustrated in FIG. 2 using traditional motion planning methods, versus the tool motion for the same 3-step machining operation using the time-optimal trajectory motion planning methods of the present disclosure.

Figure 4:
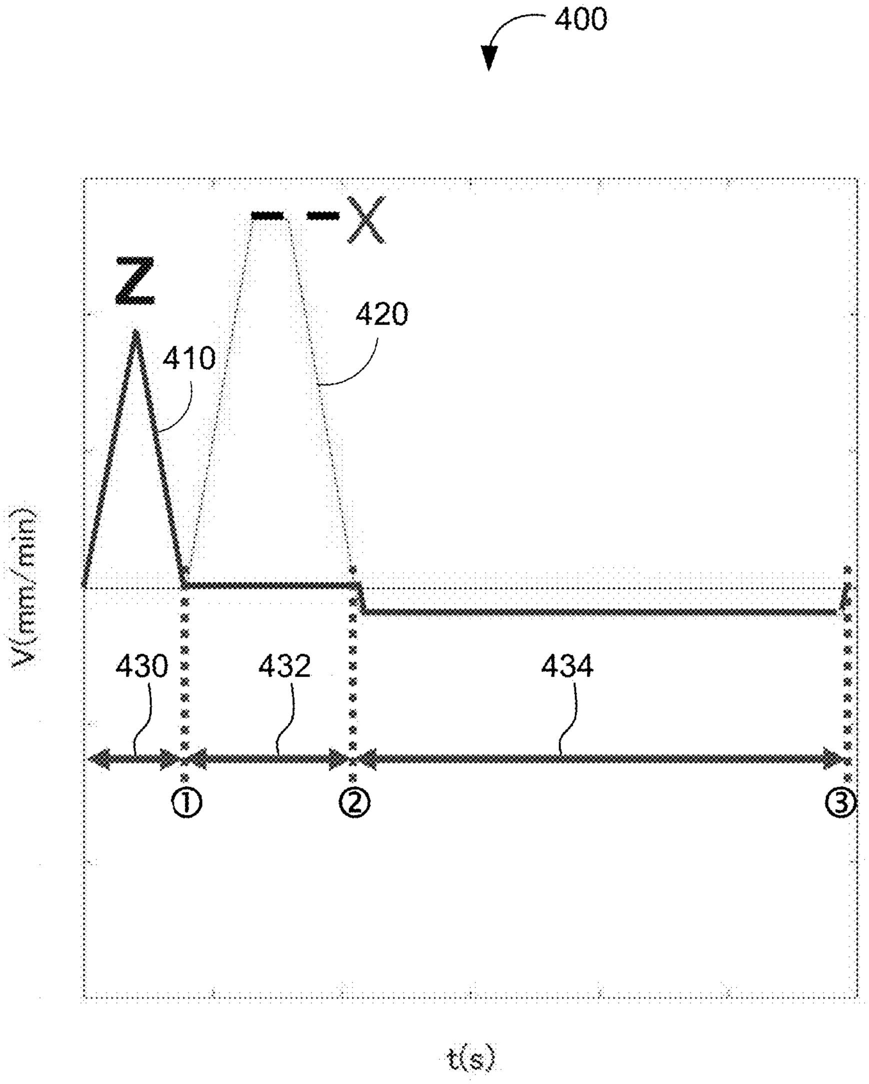
FIGURE 4 (Prior Art)
FIG. 4 is a graph of velocity versus time for the 3-step machining operation illustrated in FIG. 2 using traditional motion planning methods, as known in the art.

FIG. 4 is a graph 400 of velocity versus time for the 3-step machining operation illustrated in FIG. 2 using traditional motion planning methods, as known in the art. On the graph 400, a trace 410 plots the velocity of the cutting tool in the z (vertical) direction, while a trace 420 plots the velocity of the cutting tool in the x (horizontal) direction, as viewed in FIG. 2. The velocities are plotted versus time which is measured on a horizontal axis. The first step of the machining operation is performed during a time span indicated at 430, where the first step is lifting the cutting tool up and out of the hole 202, ending at waypoint ① which is shown at the end of the first step on the graph 400. The second step is performed during a time span 432, where the second step is moving the cutting tool horizontally to just above the hole 204, ending at waypoint ② which is shown at the end of the second step on the graph 400. The third step is performed during a time span 434, where the third step is drilling the hole 204, ending at waypoint ③ which is shown at the end of the third step on the graph 400.

In the first step in the time span 430, the traditional motion program moves the cutting tool upward with a positive z velocity and then ramps the z velocity back down to zero at waypoint ①, at which point the cutting tool is stopped. In the second step in the time span 432, the traditional motion program moves the cutting tool with a positive x velocity up to $V_{max}$, maintains the x velocity at $V_{max}$ as long as needed, and then ramps the x velocity back down to zero at waypoint ②. There is no vertical (z axis) motion in the second step using the traditional motion program. In the third step in the time span 434, again starting from a standstill, the traditional motion program accelerates the cutting tool downward to achieve a z velocity of $-V_{feed}$, and then maintains this z direction velocity to drill the hole 204 until reaching waypoint ③.

For the same 3-step machining operation using the time-optimal trajectory motion planning methods of the present disclosure, time is saved by blending each step seamlessly into the next, including not stopping the cutting tool at the end of each step, and using time available in air cut steps to complete motion from a previous step. In the first step, the time-optimal trajectory motion of the present disclosure moves the cutting tool upward at a much higher velocity than in the traditional motion programming of the graph 400, which is possible because this motion profile does not bring the z velocity back to zero during the first step. This means that the cutting bit reaches waypoint ① more quickly than in the traditional method, and as a result the first step of the disclosed method is completed in less time than the first step of the traditional method (time span 430). In the second step, the time-optimal trajectory motion of the present disclosure moves the cutting tool horizontally with the same fastest-possible point-to-point movement as in the traditional method. Also during the second step, the z velocity of the cutting tool is reduced from a high positive value to a fairly large negative value, to bring the cutting tool back down to the level of the workpiece surface. This z axis motion can be accomplished during the x axis motion without adding any time to the second step. The third step of the time-optimal trajectory motion of the present disclosure is essentially the same as in the traditional motion method, except the time-optimal motion profile reaches waypoint ② at a z velocity of $-V_{feed}$ and therefore does not need to accelerate briefly at the beginning of the third step as in the traditional method. Thus, the third step in the time-optimal motion method is slightly shorter than the traditional method.

To summarize the preceding discussion, the time-optimal motion programming method of the present disclosure is able to shorten the time duration of a multi-step machining operation by optimizing the motion across all steps, including optimization of intermediate waypoint states and not requiring the cutting tool to stop in between steps. This same concept can be extended from the drilling-specific example of FIG. 2 to the broader application of machining in general. This is discussed below.

Figure 5A:
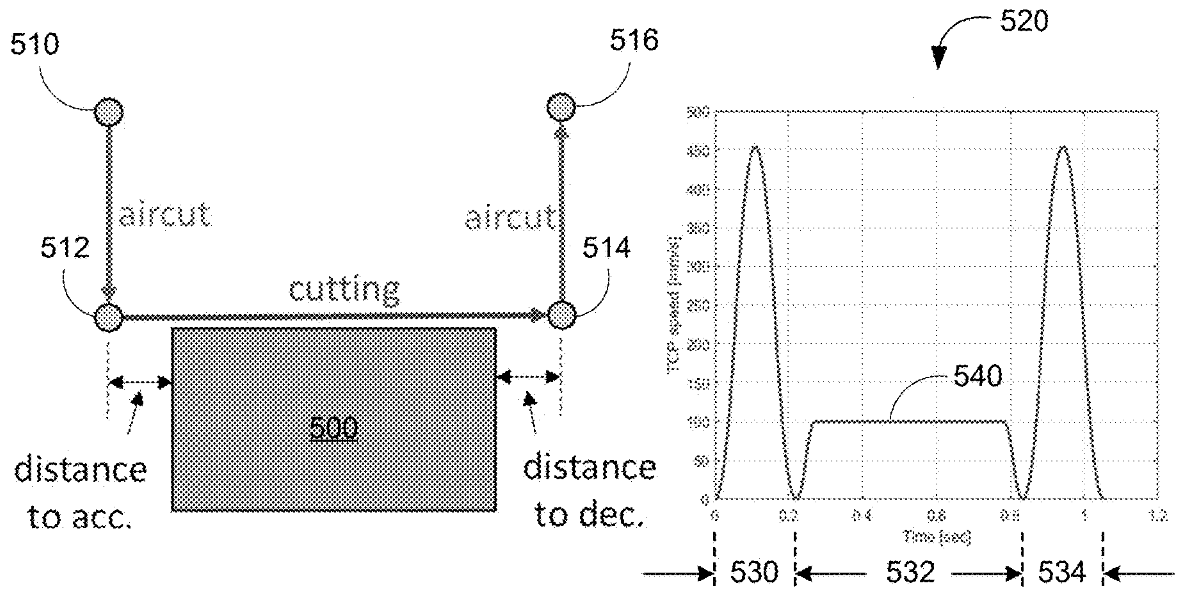
FIG. 5A is an illustration of a multi-step machining operation performed using a traditional motion planning method along with a corresponding graph of velocity versus time.
Figure 5B:
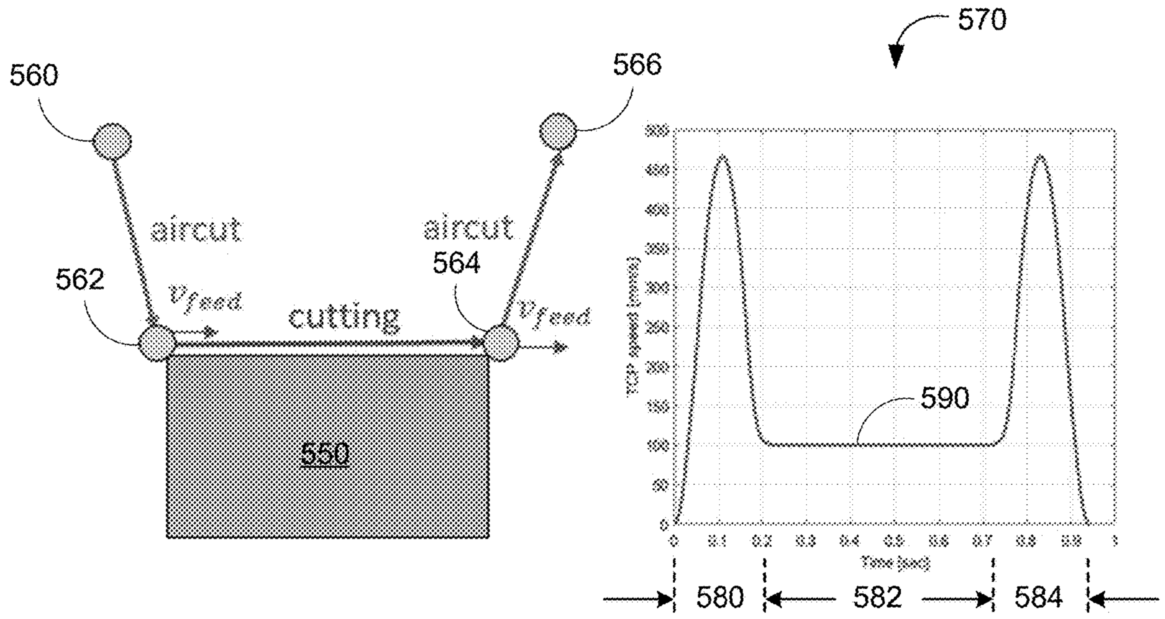
FIG. 5B is an illustration of a multi-step machining operation performed using the time-optimal trajectory motion planning methods of the present disclosure along with a corresponding graph of velocity versus time.

FIG. 5A is an illustration of a multi-step machining operation performed using a traditional motion planning method along with a corresponding graph of velocity versus time, and FIG. 5B is an illustration of a multi-step machining operation performed using the time-optimal trajectory motion planning methods of the present disclosure along with a corresponding graph of velocity versus time. The scenario of FIGS. 5A and 5B is that a workpiece 500 (or 550) is to be machined by a cutting tool whose tip or tool center point is designated by the circles connected by arrows. The cutting tool could be an end mill, for example, which mills a layer of material off the top of the workpiece 500/550.

In the traditional motion planning method of FIG. 5A, the programming user defines four waypoints; 510, 512, 514 and 516. The tool center point of the cutting tool is pre-positioned at the waypoint 510 before the machining operation begins. From the waypoint 510, the program designates that the tool center point moves in an aircut motion to the waypoint 512. This aircut motion is performed as fast as possible given mechanical limitations of the machine tool (maximum velocity, acceleration and jerk). The program then designates that the tool center point performs a cutting operation from the waypoint 512 to the waypoint 514. The waypoint 512 must be defined some distance away from the workpiece 500 in the traditional motion planning method, to allow time and space for the cutting tool to accelerate up to the proper cutting speed ($V_{feed}$) before the cutting tool encounters the workpiece surface. The same consideration must be made for deceleration after the cutting operation and before reaching the waypoint 514. An aircut motion is then performed from the waypoint 514 to the waypoint 516, thus completing the 3-step machining operation.

A graph 520 plots tool center point velocity versus time for the 3-step machining operation using the traditional motion programming method discussed above. In the first step having a time span 530, the tool center point accelerates downward in the aircut motion to the waypoint 512 where it stops. In the second step having a time span 532, the tool center point accelerates until reaching the cutting speed ($V_{feed}$—designated as 540 on the graph) just before encountering workpiece material, then performs the cutting operation at constant speed before decelerating to a stop at the waypoint 514. In the third step having a time span 534, the tool center point accelerates upward in the aircut motion to the waypoint 516 where it stops. The 3-step machining operation using the traditional motion programming method takes a total elapsed time of about 1.05 seconds.

In the time-optimal motion planning method of FIG. 5B, with a workpiece 550 having the same shape and machining parameters as the workpiece 500 of FIG. 5A, the programming user defines four waypoints; 560, 562, 564 and 566. The tool center point of the cutting tool is pre-positioned at the waypoint 560 before the machining operation begins. From the waypoint 560, the program designates that the tool center point moves in an aircut motion to the waypoint 562. This aircut motion is performed as fast as possible given mechanical limitations of the machine tool (maximum velocity, acceleration and jerk). Because the waypoint 562 is defined on the corner of the workpiece 550, the tool center point of the cutting tool must arrive at the waypoint 562 having a horizontal velocity of $V_{feed}$, and no vertical velocity. The program then designates that the tool center point performs a cutting operation from the waypoint 562 to the waypoint 564. An aircut motion is then performed from the waypoint 564 to the waypoint 566, thus completing the 3-step machining operation. The aircut motion begins with a horizontal velocity of $V_{feed}$ and ends with zero horizontal velocity, and performs the vertical motion as fast as possible, as discussed earlier.

A graph 570 plots tool center point velocity versus time for the 3-step machining operation using the time-optimal motion programming method discussed above. In the first step having a time span 580, the tool center point accelerates downward and begins moving horizontally in the aircut motion to the waypoint 562 where it arrives with the horizontal velocity of $V_{feed}$ (590) and no vertical velocity. In the second step having a time span 582, the tool center point performs the cutting operation at the constant speed of $V_{feed}$ until reaching the waypoint 564. In the third step having a time span 584, the tool center point continues horizontally and accelerates upward in the aircut motion to the waypoint 566 where it stops. The 3-step machining operation using the time-optimal motion programming method takes a total elapsed time of about 0.94 seconds, which is about 10% faster than the traditional motion programming method. The time-optimal motion programming method of the present disclosure, depicted in FIG. 5B, is once again able to shorten the time duration of a multi-step machining operation by optimizing the motion (waypoint states) across all steps and not requiring the cutting tool to stop in between steps.

Figure 6:
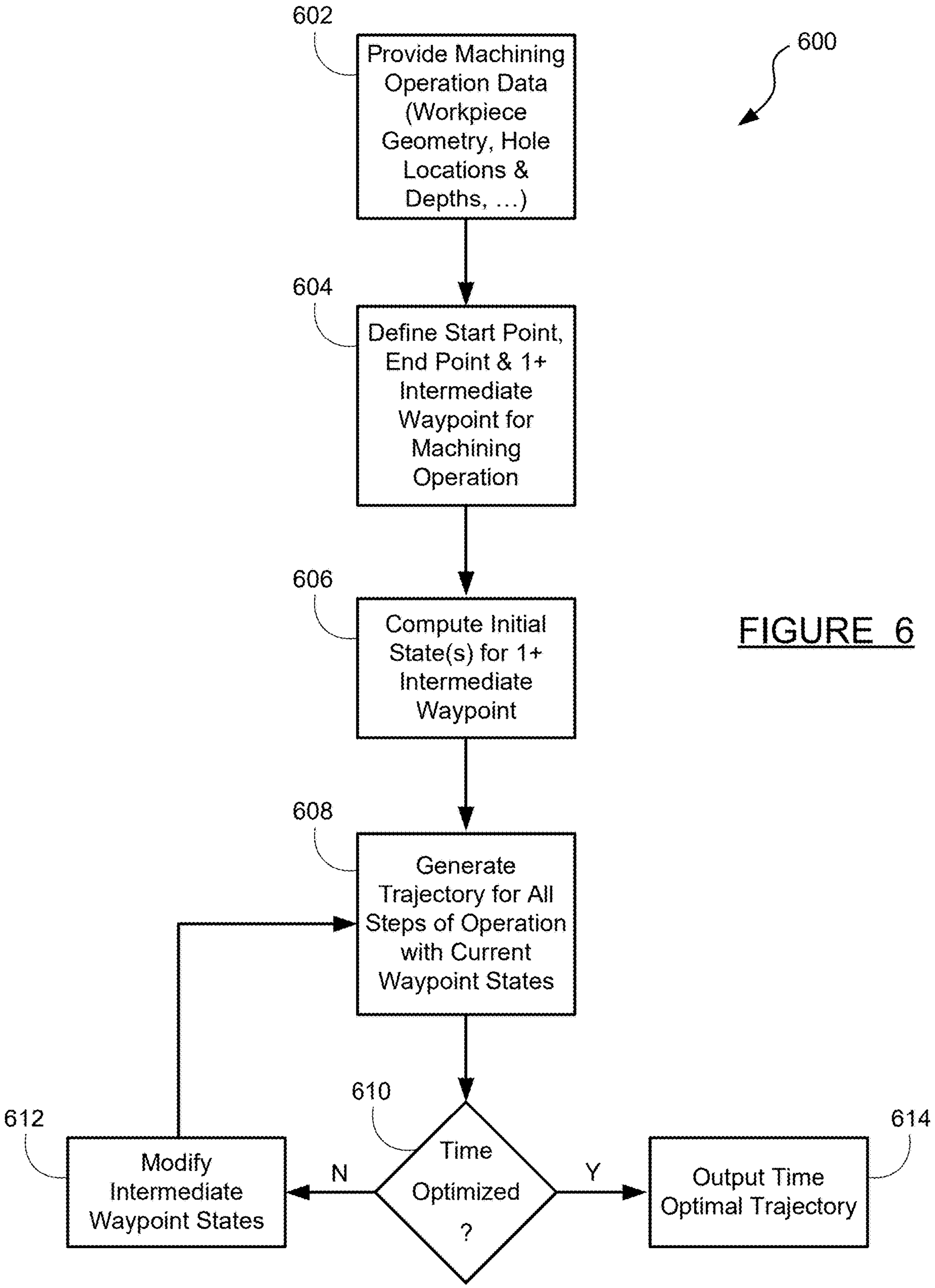
FIG. 6 is a flowchart diagram of a method for time-optimal multi-step motion planning for a machine tool, using non-static intermediate waypoint states which are selected to minimize overall cycle time, according to an embodiment of the present disclosure.

FIG. 6 is a flowchart diagram 600 of a method for time-optimal multi-step motion planning for a machine tool, using non-static intermediate waypoint states which are selected to minimize overall cycle time, according to an embodiment of the present disclosure. At box 602, data describing the multi-step machining operation is provided. This includes the 3D geometry of the workpiece, tool start and end locations (before and after the machining operation, respectively), hole locations and depths (for drilling), path shape and cutting depth (for milling), workpiece material and/or feed speed for the operation, and any other required information. Mechanical limitations of the industrial robot or machine tool are also provided either at the box 602 or built into the trajectory computation algorithm.

At box 604, locations of the key points of the overall machining operation are defined. This includes defining the start point and the end point of the machining operation, along with the location(s) of one or more intermediate waypoints, where intermediate waypoints are waypoints which connect sections of the overall machining operation. In FIG. 5B, for example, the waypoints 562 and 564 are intermediate waypoints. However, FIG. 5B could be reduced to a 2-step machining operation, with a first step from the start waypoint 560 to the intermediate waypoint 562, and a second step from the intermediate waypoint 562 to the end waypoint 564. In this case, there would only be one intermediate waypoint (562). In FIGS. 2 and 4, the waypoints ① and ② are intermediate waypoints.

At box 606, initial values of the motion state(s) for the one or more intermediate waypoints are calculated. It must be kept in mind that some intermediate waypoint states are fixed boundary conditions and cannot be varied. In FIG. 2, the x velocity at waypoints ① and ② must be zero, and the z velocity at waypoint ② must be $-V_{feed}$. These conditions cannot be changed. However, the z velocity at waypoint ① ($V_{exit}$) may be varied. As discuss earlier, the value of $V_{exit}$ certainly affects the time for the first step of the motion plan, but it may also affect the time for the second step if a large value of $V_{exit}$ causes too much vertical overshoot to be absorbed in the second step horizontal motion. A generalized approach for estimating a waypoint state without causing too much overshoot is discussed later. In FIG. 5B, none of the intermediate waypoint states are variable—as the tool center point must arrive at both the waypoints 562 and 564 with an x velocity of $V_{feed}$ and a z velocity of zero.

At box 608, an overall trajectory for the multi-step motion plan is generated using the waypoint positions (all known and fixed) and velocities (some fixed, and some variable with an initial value computed at the box 606). Generating the overall trajectory includes computing time-optimal motions in each direction based on the waypoint positions and states (velocities). If a particular step of the motion plan involves movement in more than one direction, such as the second step of FIG. 2, and the first step of FIG. 5B, then the time-optimal motion is computed for the motion in each direction, and the longest time duration is used as the time span of the step; then motions in other directions having a shorter duration may be recalculated to consume more or all of the time span of the step.

For example, in the second step of FIG. 2 (the trajectory 230), a rapid point-to-point movement in the x direction can be computed using the 7-phase jerk-bound motion computation discussed earlier, resulting in a time duration for the x motion. A motion profile in the z direction can be computed based on initial and final positions of $Z_1$, an initial vertical velocity of $V_{exit}$ and a final vertical velocity of $-V_{feed}$; this will result in a time duration for the z motion. Whichever of the time durations is longer (x or z) will dictate the time span of this step. Note that $V_{exit}$ affects the time span of the first step and may affect the time span of the second step. Thus, $V_{exit}$ is an intermediate waypoint state that can be adjusted to minimize the overall time of the 3-step motion plan. This is discussed in a later step of the method of FIG. 6.

In the other example, in the first step of FIG. 5B, a movement in the x direction can be computed to move the horizontal distance from the waypoint 560 to the waypoint 562, starting at zero velocity and ending at a horizontal velocity of $V_{feed}$, resulting in a time duration for the x motion. A motion profile in the z direction can be computed based on the vertical distance from the waypoint 560 to the waypoint 562, starting and ending at zero velocity, resulting in a time duration for the z motion. Whichever of the time durations is longer (x or z) will dictate the time span of this step. There are no intermediate waypoint states that can be adjusted to minimize the overall time of the 3-step motion plan of FIG. 5B.

At decision diamond 610, it is determined whether the trajectory computed at the box 608 is time-optimal. If a variable intermediate waypoint state (e.g., $V_{exit}$ in FIG. 2) affects the time span of one or more step, then the value of the intermediate waypoint state can be varied and the entire trajectory recomputed to determine if a shorter total time can be achieved. This optimization and re-computation is performed at box 612 and the return loop to the box 608. The optimization of intermediate waypoint states can be performed using any suitable technique-including searching-based methods, optimization-based methods, and combinations thereof. This is discussed further below.

From the decision diamond 610, when the overall time span of the motion plan (trajectory) is minimized, or when there are no variable intermediate waypoint states, the time-optimal trajectory for the multi-step motion plan is output at box 614. The time-optimal trajectory includes motions in all directions for all steps, as discussed in detail with respect to the examples above.

The calculations described above with respect to FIGS. 2, 4, 5B and 6 provide tool path motions resulting in a minimum cycle time for a multi-step machining operation, where the motion states at the waypoints which join the steps (i.e., intermediate waypoints, allowed to have non-zero velocities) are optimized to achieve the minimum overall trajectory time. There are occasions, however, where it is desirable to add a waypoint to a trajectory—such as for demonstration of a complex motion, or to avoid an obstacle during movement of the machine tool. The techniques of the present disclosure can be extended to include first computing a time-optimal trajectory in the manner discussed above, then adding a waypoint and again optimizing the waypoint states to achieve the minimum time for the overall trajectory including the additional waypoint. Examples with additional waypoints are shown in the following figures and discussed below, where all of the velocity states of the additional waypoints are variable, and iterative computation of these intermediate waypoint states (along with any other variable intermediate waypoint states) is needed in order to optimize the overall multi-step trajectory time.

Figure 7:
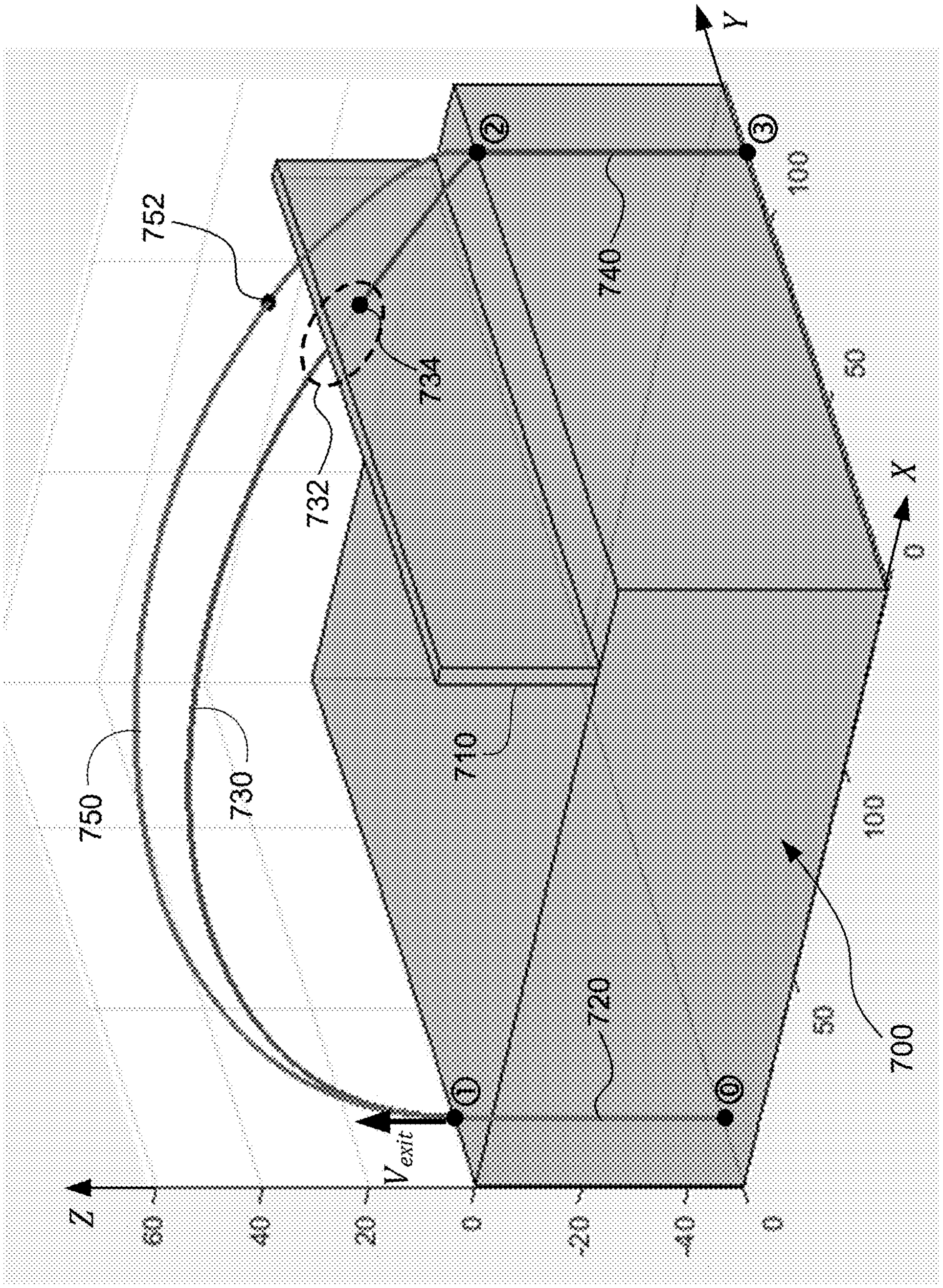
FIG. 7 is an isometric view illustration of a workpiece machining operation where a tool path trajectory is to be determined which provides a shortest cycle time while also avoiding an obstacle in the path, according to an embodiment of the present disclosure.

FIG. 7 is an isometric view illustration of a workpiece machining operation where a tool path trajectory is to be determined which provides a shortest cycle time while also avoiding an obstacle in the path, according to an embodiment of the present disclosure. FIGS. 7-10 all depict examples where a waypoint is added to a multi-step machining operation for obstacle avoidance, and a time-optimal trajectory including the additional waypoint is computed. These examples include techniques for determining a location of the additional waypoint in order to avoid the obstacle. However, it is to be understood that a waypoint can be added to a multi-step machining operation for reasons other than obstacle avoidance, and the disclosed techniques used for determining a time-optimal trajectory including the additional waypoint.

A workpiece 700 corresponds generally with the workpiece 100 of FIG. 1 and the workpiece 200 of FIG. 2. In this case, however, an obstacle 710 exists which interferes with the tool path trajectory. The obstacle 710 may be part of the workpiece 700, or may be a separate object such as a tool or fixture.

No holes are shown in the workpiece 700. It is to be understood that a first hole is already machined at the left side of the workpiece 700, and the tool tip needs to be moved upward along a path 720, then repositioned (air cutting) along a trajectory 730 in order to machine a second hole along a path 740 at the right side of the workpiece 700. The waypoints ⓪, ①, ② and ③ have the same meaning as discussed in the earlier figures, being the tops and bottoms of the respective holes.

FIG. 7 is a three-dimensional illustration, with x, y and z directions depicted on a spatial grid. In this example, the second hole (the path 740) is offset in the y direction from the first hole (the path 720). Thus, the trajectory 730 must traverse both a ΔX and a ΔY in tracing a path from point ② at the top of the first hole to point ② at the top of the second hole (while moving up and back down in the z direction). The computation of the y coordinate in the trajectory 730 is a straightforward matter, as the y motion of the tool tip can be accomplished using an acceleration ramp-up to a velocity, then ramping back down to zero velocity in the y direction when reaching waypoint ②. After computation of the x, y and z motions for this step, if the time duration of the y motion is longest, then the motions in the other two directions can be re-planned to use this time span, as discussed earlier.

The trajectory 730 was computed in the manner discussed with respect to FIG. 2, being part of a 3-step machining operation which is time-optimal by varying the value of $V_{exit}$ at waypoint ①. The trajectory 730 computation accommodates the y direction offset as just described. However, after computation in this manner, it is determined that the trajectory 730 interferes with the obstacle 710 in the region depicted by ellipse 732. Thus, a new trajectory must be calculated which moves as quickly as possible from waypoint ① to waypoint ②, while avoiding collision with the obstacle 710. Techniques for computing a collision-free tool path trajectory are known in the art, however, these techniques do not find a time-optimal collision-free trajectory. For example, a collision-free trajectory might be scaled in a vertical direction until the obstacle is avoided and thus be unnecessarily lengthy, or a multi-segment trajectory might be computed which avoids the obstacle but includes slowdowns or stops at inflection points or intermediate waypoints. These approaches are not optimal.

Computation of a time-optimal collision-free trajectory is accomplished using the techniques of the present disclosure as follows; after computing a time-optimal trajectory 730 for the machining operation not including the additional waypoint, a critical point 734 is identified as the point on the trajectory 730, nearest to waypoint ②, which interferes with the obstacle 710; then a point 752 is defined which is vertically above the critical point 734 by some clearance distance, and a new trajectory is computed which uses the point 752 as an additional waypoint (that is, the new trajectory passes through the point 752 on its way from point ① to point ②. Details of these computations are discussed below, with the computations adjusted to accommodate different scenarios relative to obstacle size and position, each of which scenario is shown in the remaining figures.

Figure 8:
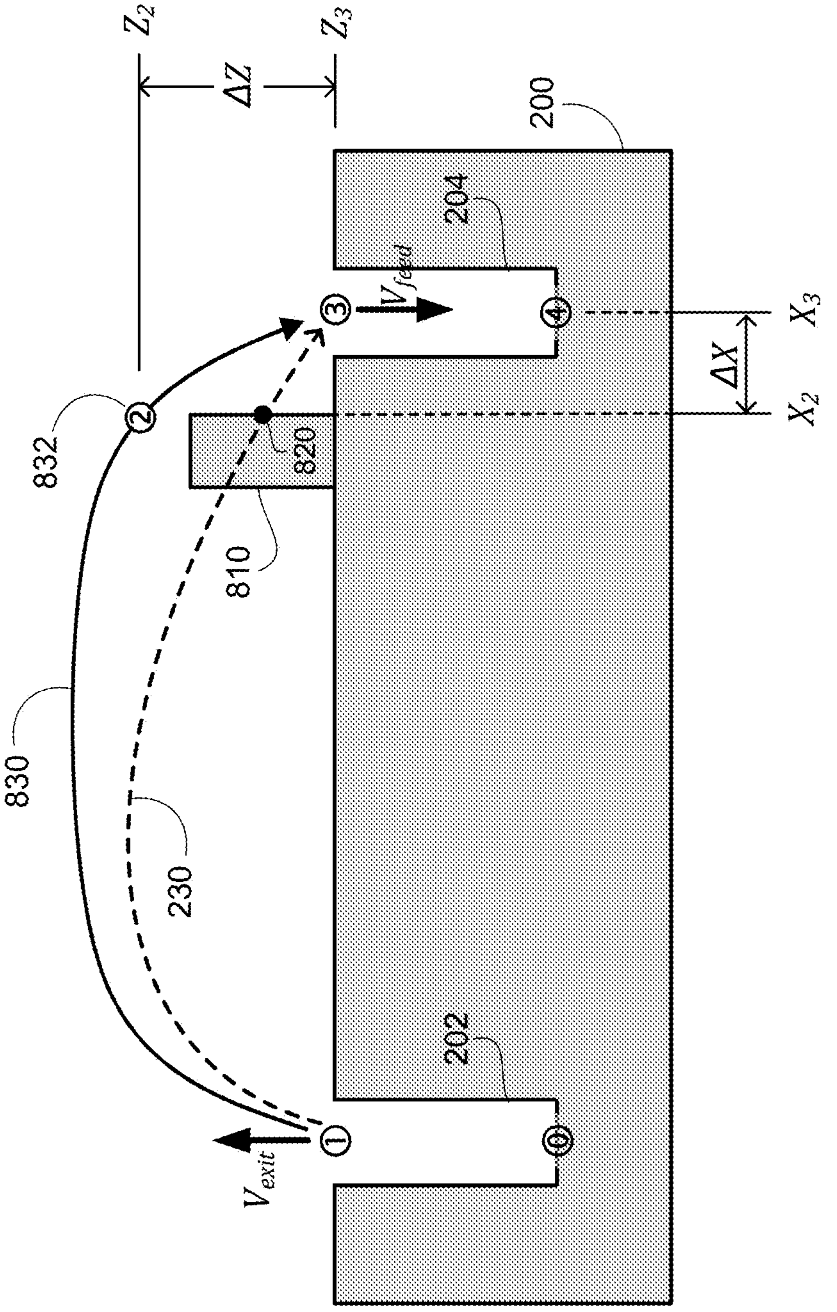
FIG. 8 is a cross-sectional illustration of the workpiece and machining operation of FIG. 2, where an obstacle interferes with the time-optimal trajectory, and a new collision-free trajectory is computed which passes through an additional waypoint, according to an embodiment of the present disclosure.

FIG. 8 is a cross-sectional illustration of the workpiece 200 and machining operation of FIG. 2, where an obstacle interferes with the time-optimal trajectory, and a new collision-free trajectory is computed which passes through an additional waypoint, according to an embodiment of the present disclosure. The discussion of FIG. 8 provides an explanation of the computation of the time-optimal trajectory for a first obstacle scenario, including the adjustments to the waypoints and their corresponding state conditions which are necessary to ensure the trajectory is collision-free.

The workpiece 200 is shown with the hole 202 and the hole 204, the same as in FIG. 2. Also the same as the earlier discussion, the machining operation involves first machining the hole 202, then repositioning the tool at the top of the hole 204 and machining the hole 204. The computation of the time-optimal trajectory 230 for the 3-step motion program (without the additional waypoint for collision avoidance) was discussed earlier. Thus, for the scenario depicted in FIG. 8, the objective is computation of a time-optimal collision-free trajectory from the hole 202 to the hole 204.

An obstacle 810 is included in FIG. 8, in a scenario similar to FIG. 7. The obstacle 810 may be part of the workpiece 200, or may be a separate object such as a tool or fixture. The time-optimal trajectory 230 from FIG. 2 is shown again in FIG. 8, and it can be seen that the trajectory 230 interferes with the obstacle 810. A point 820 (the critical point) is computed as the point on the trajectory 230, nearest the terminal end of the trajectory 230, which intersects (interferes) with the obstacle 810. The computation of the coordinates of the point 820 is a straightforward matter, given the 3D spatial definition of the trajectory 230 and a mathematical representation (such as from a CAD solid model) of the obstacle 810. The obstacle 810 may have any arbitrary shape; the "wall"-shaped obstacle illustrated in FIG. 8 is used merely for drawing clarity.

Following is a discussion of the computation of a time-optimal collision-free trajectory 830. After computation of the time-optimal trajectory 230, a point 832 is calculated which will be a waypoint in the trajectory 830. In a preferred embodiment, the point 832 is directly vertically above the point 820, offset in the z direction by a certain distance. The offset distance of the point 832 above the point 820 may be determined in any suitable manner-including defining the offset as a fixed distance above a top of the obstacle 810, or computing the offset as a ratio of a distance from the point 820 to the top of the obstacle 810, for example.

With the coordinates of the point 832 calculated, the waypoints for the time-optimal collision-free trajectory 830 are defined as follows; waypoints ⓪ and ① are at the bottom and top of the hole 202, respectively, as defined previously; the point 832 is now defined as waypoint ②, which is an intermediate waypoint with variable states; and waypoints ③ and ④ are at the top and bottom of the hole 204, respectively.

If a traditional machine tool path motion generation algorithm is employed to calculate a trajectory using the waypoints ⓪ through ④, the results are unpredictable. In one such example, a trajectory was computed which started upward from waypoint ①, dipped back down into the workpiece 200, then proceeded up and through waypoint ②, overshooting the end of the workpiece 200 dramatically before looping back and down to waypoint ③. Such a trajectory is obviously not satisfactory, for a number of reasons. Thus, a multi-step technique is needed which calculates the time-optimal collision-free trajectory 830 having the desired shape characteristics based on waypoint state boundary conditions.

For the obstacle scenario of FIG. 8, the following notations are defined; $X_2$ is the x coordinate of waypoint ② and $X_3$ is the x coordinate of waypoint ③; $\Delta X$ is the difference (x distance) between $X_2$ and $X_3$; $\Delta Z$ is defined similarly, using the z coordinates of waypoints ② and ③.

The time-optimal collision-free trajectory for the entire multi-step operation is computed using the following logic. First, it is important to recognize that the complete multi-step operation now includes five waypoints joined by four steps or segments. However, the time-optimal trajectory for the complete operation can be computed in a similar manner to that discussed earlier for the 3-step operation with four waypoints. That is, initial estimates are made for all variable waypoint states; then the waypoint states (fixed and variable) are used to compute each trajectory segment and determine an overall time to complete the multi-step operation; finally, the variable waypoint states are optimized to find a minimum overall time to complete the multi-step operation.

For the scenario of FIG. 8, the waypoint position and velocity states are defined as follows:

TABLE 2

| Waypoint | ⓪ | | ① | | ② | | ③ | | ④ | |
|---|---|---|---|---|---|---|---|---|---|---|
| State | pos. | vel. | pos. | vel. | pos. | vel. | pos. | vel. | pos. | vel. |
| x axis | $X_0$ | 0 | $X_0$ | 0 | $X_2$ | $V_{x,2}$ | $X_3$ | 0 | $X_3$ | 0 |
| z axis | $Z_0$ | 0 | $Z_1$ | $V_{exit}$ | $Z_2$ | $V_{z,2}$ | $Z_1$ | $-V_{feed}$ | $Z_0$ | 0 |

In Table 2, all of the waypoint positions are known, and most of the velocity states are known and fixed. Only the velocities $V_{exit}$, $V_{x,2}$ and $V_{z,2}$ are unknown. These three velocities may be varied in order to minimize the overall time of the 4-step operation. Initial values for the three variable velocity states may be determined using heuristic methods, and optimal values for the three variable velocity states may be determined (to achieve minimum overall time) using searching-based and/or optimization-based methods, all of which are discussed below.

FIG. 8 depicts a fairly short obstacle 810, and in this scenario the time-optimal collision-free trajectory is already on its way downward when reaching waypoint ②. Another scenario is possible where a tall obstacle is located near the second hole (the hole 204). In this situation, the time-optimal collision-free trajectory may have its highest point located at or near waypoint ②; in other words, the velocity in the z direction will be zero or nearly zero when passing through waypoint ②. This knowledge may be used in determining an initial estimate of the velocity states at waypoint ②. The final values of waypoint ② states will be determined in a manner discussed later—such as an optimization computation which finds a minimum total time for the time-optimal collision-free trajectory of the complete multi-step operation.

FIGS. 7-8 both depict an obstacle which is located nearer the destination (the second hole) than the origin (the first hole) of the trajectory. The corresponding trajectory calculations therefore involve a variable velocity state at waypoint ② which precedes a known state at waypoint ③. Situations may arise where the obstacle is located nearer the origin (the first hole) than the destination (the second hole). This situation requires two adjustments to the techniques discussed earlier. First, the critical point (the point used to determine waypoint ②) is located on the approaching side of the obstacle rather than the departing side. Second, the initial estimates of velocity states at waypoint ② are made by approximating a trajectory from waypoint ① to waypoint ②, rather than from waypoint ② to waypoint ③ as discussed above.

The preceding discussion of FIGS. 7-8 describes techniques for computing a time-optimal collision-free trajectory for the tool in a multi-step drilling operation as depicted in FIG. 1; the methods are equally applicable to a multi-step general machining operation as depicted in FIG. 5B. The techniques are defined to first compute a time-optimal trajectory for the machining operation, and then accommodate any situation where an obstacle interferes with the time-optimal trajectory, whether the obstacle is encountered when departing the first machined feature (e.g., hole) or the obstacle is encountered when approaching the second machined feature. The techniques are also able to accommodate situations where the obstacle is short enough to permit the computed trajectory to have a vertical component of velocity when passing the obstacle, and situations where the obstacle is so tall that the best time-optimal collision-free trajectory is at its highest point when passing the obstacle. As mentioned earlier in the discussion of FIG. 3, in addition to horizontal (x) motion and vertical (z) motion, motion in the other horizontal direction (y) may be needed to reach the second hole; this y motion can calculated to be accomplished during the timespan of the x-z trajectory.

As described throughout the preceding discussion, the computation of the time-optimal collision-free trajectory for a multi-step machining operation includes computing a time-optimal trajectory for the multi-step operation, adding a waypoint at a location selected to clear an obstacle, and computing the time-optimal collision-free trajectory using the original time-optimal trajectory and the additional waypoint. The additional waypoint may be added for other reasons besides collision avoidance, as well.

It will be recalled that the original time-optimal trajectory (without the added waypoint) may include an intermediate waypoint with a variable state, such as $V_{exit}$ at waypoint ①) in FIGS. 2 and 7-8. The value of $V_{exit}$ affects the motion in the vertical (z) direction of both steps 1 and 2 of the motion plan. It may therefore affect the time to complete step 2, which would affect the horizontal motion in step 2, which may lead to the need to change the value of $V_{exit}$. As a result of all of these interdependencies, there is no way to compute an optimal value of $V_{exit}$ using closed-form calculations. In order to determine an optimal value of $V_{exit}$ (resulting in minimum overall time for the multi-step operation), it is necessary to perform an iterative computation including selecting an initial value of $V_{exit}$, calculating all of the steps of the motion plan using $V_{exit}$ and determining the total time span, selecting a new value of $V_{exit}$ and repeating the calculations until a minimum total time is found.

Then when an additional waypoint is added, for collision avoidance or any other reason, the additional waypoint typically has variable velocity states in all directions (e.g., x and z; or x, y and z). These additional variable states (e.g., $V_{x,2}$ and $V_{z,2}$) represent unknowns which add even more variable interdependencies to the calculation of the motion plans for each segment in each direction. Again, the only way to handle these complex, highly nonlinear variable interdependencies is to select initial values of the variable velocity states, then perform an iterative computation of the entire multi-step motion plan which ultimately identifies optimal values of the variable velocity states which result in a minimum overall time span for the multi-step motion plan.

Both the selection of initial values of the variable velocity states, and the iterative computation to identify optimal values of the variable velocity states which result in a minimum overall time, are discussed further below, as part of the discussion of a general method for computing a time-optimal trajectory for a multi-step motion plan with an additional waypoint.

Figure 9:
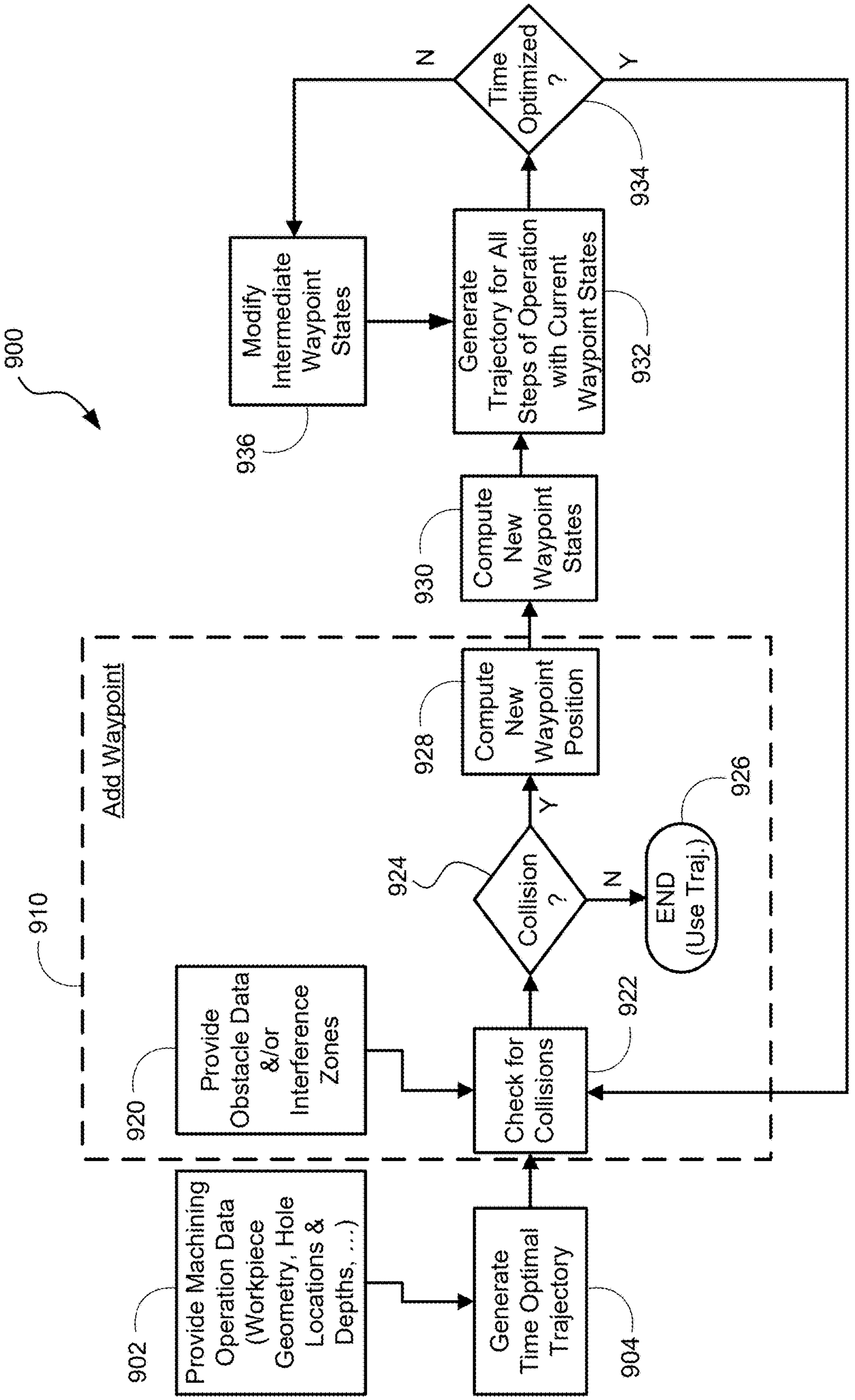
FIG. 9 is a flowchart diagram of a generalized method for time-optimal collision-free machine tool motion planning, according to an embodiment of the present disclosure.

FIG. 9 is a flowchart diagram 900 of a generalized method for time-optimal collision-free multi-step machine tool motion planning, according to an embodiment of the present disclosure. Whereas FIG. 6 defined a method for computing a time-optimal trajectory for a multi-step machining operation, FIG. 9 includes an additional intermediate waypoint with variable velocity states (waypoint ②) and an iterative loop to determine values of all variable waypoint states which produce a time-optimal collision-free trajectory.

At box 902, data describing the multi-step machining operation is provided. This includes the 3D geometry of the workpiece, tool start and end locations (before and after the machining operation, respectively), hole locations and depths (for drilling), path shape and cutting depth (for milling), workpiece material and/or feed speed for the operation, and any other required information. Mechanical limitations of the industrial robot or machine tool are also provided either at the box 902 or built into the trajectory computation algorithm. At box 904, a time-optimal trajectory is computed for the multi-step machining operation, without an additional waypoint, as discussed with respect to FIG. 6. The computations performed in the box 904 include everything after the box 602 of FIG. 6 (computing a trajectory for the multi-step operation and optimizing one or more intermediate waypoint state, such as $V_{exit}$).

At box 910 (the large dashed box), a waypoint is added to the original set of waypoints defining the multi-step machining operation. The waypoint may be added manually or automatically for any purpose. One particular example is adding a waypoint for collision avoidance; i.e., to modify the time-optimal trajectory computed at the box 904 in order to avoid an obstacle. The steps for the collision avoidance application of an additional waypoint are shown inside the box 910.

At box 920, obstacle data for the machining operation workspace is provided. This includes obstacles such as the obstacle 710 shown in FIG. 7, and similarly in FIG. 8. Obstacles may have any shape, and more than one obstacle may be present in the workspace. An obstacle may also be presented by parts of the workpiece geometry itself. Instead of or in addition to physical obstacles, interference zones may be defined (geometric regions or zones which no part of the robot/machine or tool is permitted to enter). Obstacles and interference zones will be collectively referred to as obstacles. At box 922, it is determined whether the time-optimal trajectory from the box 904 interferes with the obstacle(s) from the box 920. This is a straightforward calculation using the 3D geometry of the trajectory and the obstacles. At decision diamond 924, if there is no trajectory-obstacle collision, the process ends at terminus 926 and the previously-computed trajectory is used for the machining operation.

When a trajectory-obstacle collision is detected, a location of a new waypoint is computed at box 928. Techniques for computing the new waypoint position to avoid the obstacle were described earlier, including computing the critical interference point and establishing the new waypoint at an offset distance from the critical point. If the additional waypoint is to be added for reasons other than collision avoidance, the new waypoint position is simply computed or determined at the box 928.

At box 930, initial estimates of velocity states for the additional waypoint are computed. In one embodiment, the initial estimate for $V_{exit}$ (which is a variable waypoint velocity state in the overall multi-step machining operation) is set equal to the value of $V_{exit}$ from the time-optimal trajectory computed at the box 904. Thus, at the box 930, only the initial estimates of the velocity states for the additional waypoint ② (e.g., $V_{x,2}$, $V_{z,2}$) need be computed.

As discussed earlier, there is no way to directly compute the velocity states at waypoint ② which will result in a minimum overall time for the multi-step machining operation. However, it is possible to calculate an initial estimate of the waypoint velocity states. The discussion below continues to focus on the examples shown in FIGS. 7-8—a multi-step drilling operation where a waypoint needs to be added for collision avoidance. It is to be understood that all of the steps of FIG. 9—including the intermediate waypoint state estimation—are equally applicable to multi-step machining operations in general, such as the one depicted in FIG. 5B.

One approach to computing the initial estimate of the waypoint ② velocity states is a heuristic method which computes the horizontal motion profile first (from waypoint ① to waypoint ③—using the jerk-bound seven-phase calculation discussed earlier), then computes the vertical motion profile based on the horizontal motion timing at waypoint ②. This approach produces values of the velocities (e.g., $V_{x,2}$, $V_{z,2}$) at waypoint ②. However, depending on geometric conditions (e.g., height and horizontal position of the obstacle), the heuristic method may not provide the most suitable initial estimates of the waypoint ② velocity states.

Consider for example a case where a tall obstacle exists immediately adjacent to the second hole. In this case it may not be possible to move the tool tip vertically from waypoint ② to waypoint ③ (a large $\Delta Z$) in the short time it takes for the small $\Delta X$ horizontal motion. The horizontal motion would therefore have to be slowed down from the time-optimal horizontal profile in order to allow time for the vertical motion according to constraints on maximum velocity/acceleration/jerk. This creates an interdependency between the horizontal and vertical motions, including the possibility that the best overall time for the multi-step operation might include a small trajectory overshoot in the horizontal direction.

Figure 10A:
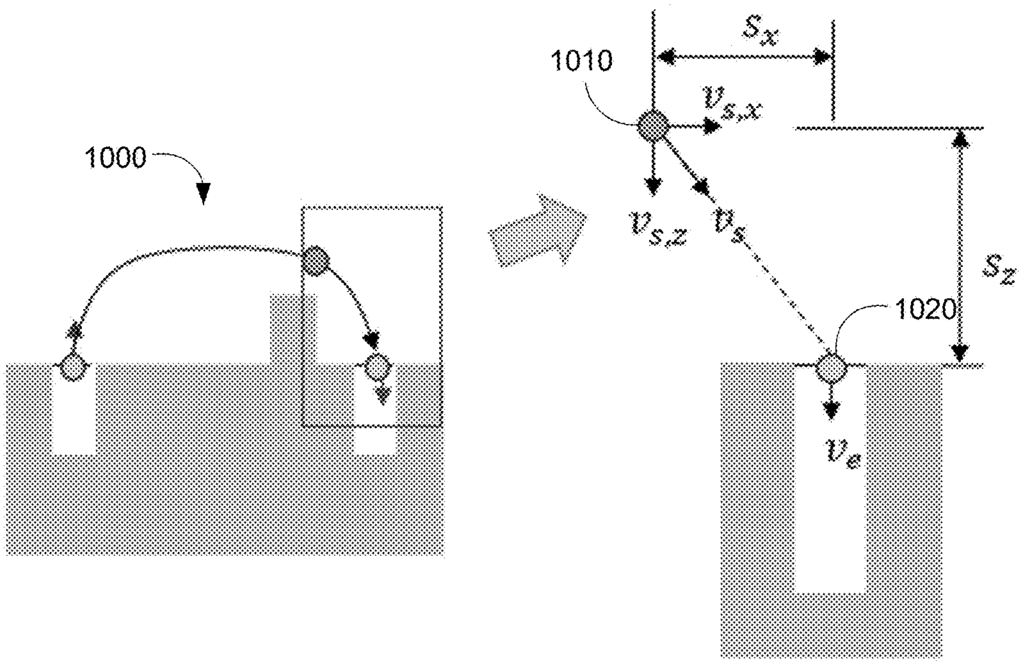
FIGS. 10A, 10B and 10C are illustrations of obstacle avoidance trajectories depicting the concepts involved in a technique for determining initial estimates of velocity states at an intermediate waypoint, according to an embodiment of the present disclosure.
Figure 10B:
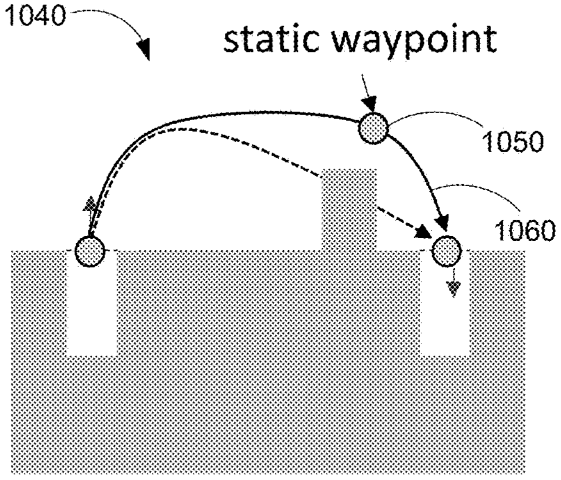
Figure 10C:
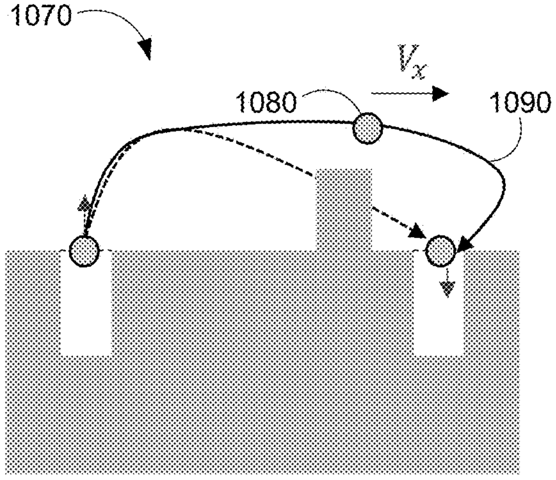

FIGS. 10A, 10B and 10C are illustrations of obstacle avoidance trajectories depicting the concepts involved in a technique for determining initial estimates of velocity states at an intermediate waypoint, according to an embodiment of the present disclosure. FIG. 10A includes a simplified illustration 1000 of an obstacle avoidance trajectory of the type shown in FIG. 8 (an original time-optimal trajectory modified to avoid an obstacle by adding a waypoint), along with an enlarged portion annotated with relevant position and velocity information.

FIG. 10B is an illustration 1040 of an obstacle avoidance scenario where an additional waypoint 1050 is defined to be static—that is, the tool center point stops along the trajectory at the waypoint 1050. This results in a multi-step trajectory 1060 which does not have any overshoot in the x direction, but the trajectory 1060 is unnecessarily slow due to the complete stop at the waypoint 1050.

FIG. 10C is an illustration 1070 of an obstacle avoidance scenario where an additional waypoint 1080 is allowed to carry a large residual horizontal velocity $V_x$ (continuation of motion from the trajectory before the waypoint 1080). This results in a multi-step trajectory 1090 which significantly overshoots the next waypoint in the x direction, thereby requiring more time in the final step of the motion in order to return the tool center point to the top of the hole to be drilled.

An ideal initial estimate of the velocity states at the intermediate waypoint (e.g., the waypoint 1050 or 1080) does not require a full stop of the tool center point at the waypoint, but does not carry so much residual horizontal velocity that a large overshoot results. The technique described below provides such an initial estimate of waypoint velocity states.

Referring again to FIG. 10A, a waypoint 1010 corresponds with waypoint ② of FIG. 8; this is the additional waypoint with variable velocity states. Similarly, a waypoint 1020 corresponds with waypoint ③ of FIG. 8; this is the top of the hole to be drilled, and the tool center point therefore must arrive at the waypoint 1020 with a velocity in the x direction of zero and a velocity the z direction of $-V_{feed}$. For the purposes of the present calculations, the velocity of a trajectory when reaching the waypoint 1020 is an ending velocity labeled $V_e$. Similarly, the velocity of a trajectory when passing the waypoint 1010 is a starting velocity labeled $V_s$, comprised of components $V_{s,x}$ and $V_{s,z}$. The distances in the x and z directions from the waypoint 1010 to the waypoint 1020 are $S_x$ and $S_z$, respectively. As mentioned earlier, FIG. 10A is illustrated in two dimensions for clarity, but the velocity state calculations described here may be performed for all three dimensions.

In the scenario of FIG. 10A, the tool center point may be accelerating or decelerating when it reaches the intermediate waypoint 1010. An S-type acceleration/deceleration control model may be applied to the scenarios described above, whereby equations are defined which can be solved to determine the desired value of $V_{s,x}$ and $V_{s,z}$. Referring back to FIG. 3, a jerk-bound acceleration profile is depicted in phases I-III, and a jerk-bound deceleration profile is depicted in phases V-VII. In the earlier discussion of FIG. 3, a set of polynomial equations was described which relate the position at the end of each phase to the time duration of the phase, the maximum jerk and the velocity and acceleration values at the end of the phase (each of which have their own polynomial equations). These same equations can be used to compute a jerk-bound velocity at the intermediate waypoint 1010, in each coordinate direction, for which the trajectory can reach the waypoint 1020 with the required velocity boundary conditions.

Figure 11:
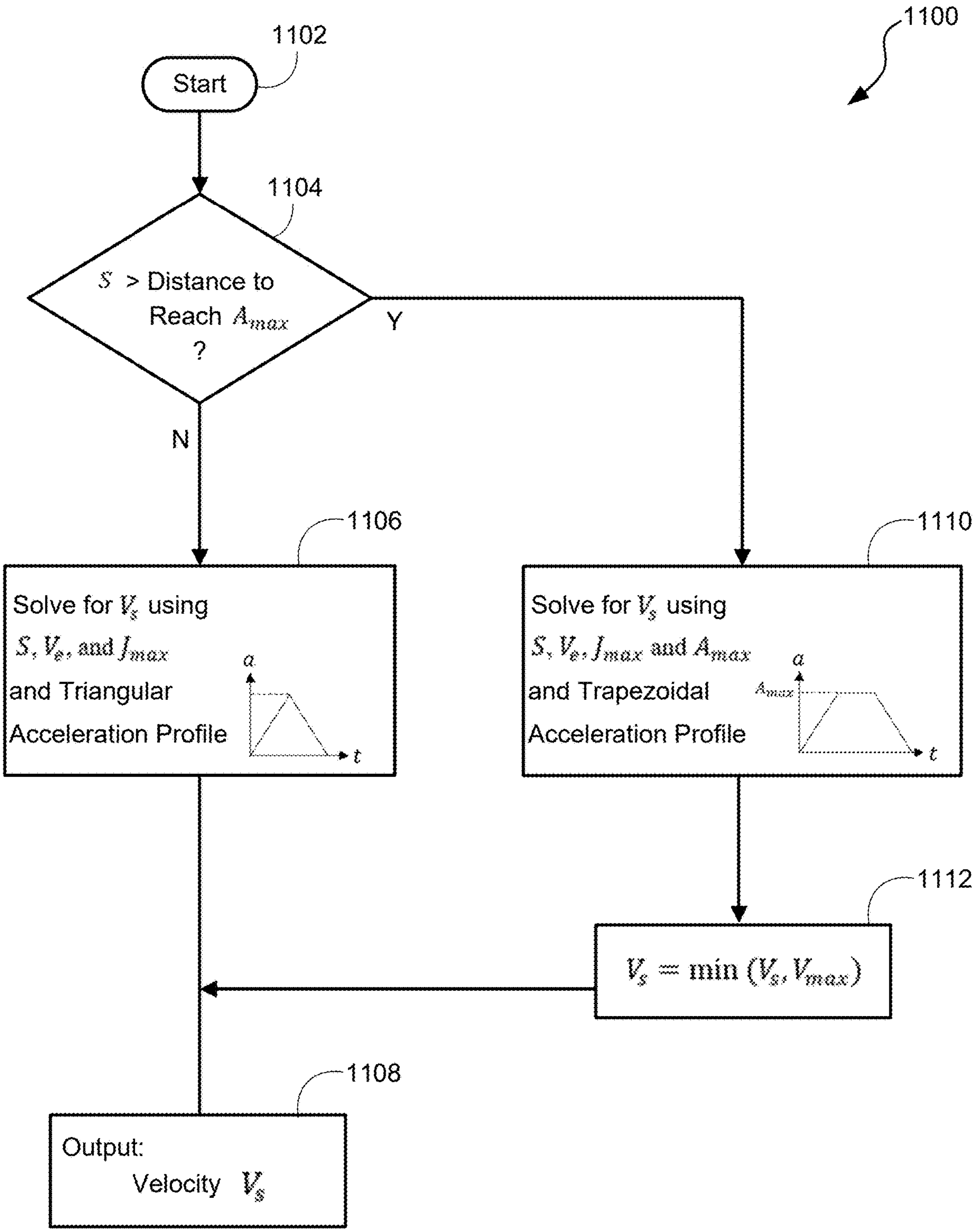
FIG. 11 is a flowchart diagram of a method for determining initial estimates of velocity states at an intermediate waypoint used in time-optimal collision-free machine tool motion planning, according to an embodiment of the present disclosure.

FIG. 11 is a flowchart diagram 1100 of a method for determining initial estimates of velocity states at an intermediate waypoint used in machine tool motion planning, according to an embodiment of the present disclosure. The calculations of FIG. 11 are performed for each coordinate direction (e.g., x and z; or x, y and z). After starting at 1102, given the ending velocity $V_e$ and the travel distance S as shown in FIG. 10A, at decision diamond 1104 it is determined whether the jerk-bound S-type acceleration/deceleration motion will have a trapezoidal acceleration profile (with a flat center section at $A_{max}$, as in phase I-III and phase V-VII of FIG. 3), or a triangular shape (never reaching $A_{max}$). This is determined by calculating whether S in a given coordinate direction (e.g., $S_x$) is greater than the distance needed to reach $A_{max}$. If not, then at box 1106, the starting velocity in the particular direction (e.g., $V_{s,x}$) is calculated using $V_e$, S and $J_{max}$ in a jerk-bound motion with linear increase/decrease of acceleration and no constant acceleration phase (i.e., a triangular acceleration profile). The value calculated at the box 1106 is output at box 1108 and used as the starting velocity in the particular direction (e.g., $V_{s,x}$). Again, this value (e.g., $V_{s,x}$) is used at the box 930 of FIG. 9 as the initial estimate of one of the velocity states for the additional waypoint ② (e.g., $V_{x,2}$).

If the answer is yes at the decision diamond 1104, then at box 1110 the starting velocity in the particular direction (e.g., $V_{s,x}$) is calculated using $V_e$, S, $A_{max}$ and $J_{max}$ in a jerk-bound motion with linear increase/decrease of acceleration and a constant acceleration phase between the increase and decrease phases (i.e., a trapezoidal acceleration profile). Then at box 1112 a final value of $V_s$ is determined by taking the minimum of the value of $V_s$ calculated at the box 1110 and the maximum velocity $V_{max}$ prescribed by machine limitations. From the box 1112, the value of $V_s$ is output at the box 1108.

The flowchart of FIG. 11, based on the jerk-bound motion calculations discussed earlier, can be adapted to handle either a deceleration scenario (where $V_s>V_e$) or an acceleration scenario (where $V_s<V_e$). Moreover, it can be adapted to calculate $V_e$ by giving $V_s$, S, $A_{max}$ and $J_{max}$.

The scenario of FIGS. 10A-10C and the waypoint state calculation method described above with respect to FIG. 11 is where the intermediate waypoint is located nearer the waypoint at the top of the hole to be drilled (the second hole), the ending velocity states are known, and the objective is to compute values of the starting velocities $V_{s,x}$ and $V_{s,z}$ which are the variable waypoint velocity states. An opposite scenario can be envisioned, where the intermediate waypoint is located nearer the waypoint at the top of the first hole (which is already drilled, and which the tool is exiting), the starting velocity $V_s$ is $V_{exit}$ at the top of the first hole and the ending velocity $V_e$ has components $V_{e,x}$ and $V_{e,z}$ which need to be determined. In either scenario (obstacle nearer first hole or second hole), the tool center point may be accelerating or decelerating when it reaches the intermediate waypoint. Calculation of the intermediate waypoint velocity states for any of these scenarios may be performed in the manner discussed above with respect to FIGS. 10A-10C and 11.

Returning to FIG. 9, after initial values of the velocity states for the new waypoint are determined at the box 930, a trajectory for the multi-step operation is generated at box 932. The overall trajectory for the multi-step motion plan is generated using the waypoint positions (all known and fixed) and velocities (some fixed, and some variable with an initial value computed at the box 930). Generating the overall trajectory includes computing time-optimal motions in each direction based on the waypoint positions and states (velocities). The trajectory generation at the box 932 is similar to the trajectory generation at the box 608 of FIG. 6 described earlier, except in FIG. 9 the trajectory includes the additional waypoint—such as the examples shown in FIG. 8, with five waypoints and four steps or trajectory segments.

Following the first instance of computing a trajectory at the box 932, an iterative loop is established where new values of the variable states (e.g., $V_{exit}$ and the state velocities ($V_{x,2}$, $V_{z,2}$) for waypoint ②) are tried and a new trajectory is computed. This iterative loop includes determining at decision diamond 934 if the total cycle time has been optimized (which can only be determined after several loops, and depending on a convergence criteria), and if not, modifying the intermediate waypoint states (e.g., $V_{exit}$, $V_{x,2}$ and $V_{z,2}$) at box 936, then re-computing the trajectory for the multi-step operation with the additional waypoint and determining the total cycle time. This continues until the total cycle time t reaches a minimum value as determined by a convergence criteria, or a maximum number of iterations is reached. Each trajectory is also evaluated to ensure that the boundary condition constraints have been met (e.g., vertical velocity of $-V_{feed}$ at waypoint ③, etc.).

At least two different techniques may be used to implement the optimization loop between the boxes 932 and 936. One approach is to use a sampling method to test values of $V_{exit}$ and the state velocities for waypoint ② (i.e., $V_{x,2}$, $V_{z,2}$) which are slightly higher and slightly lower than the previously-used values, and determine if a valid trajectory (which meets boundary conditions) can be found with a shorter total cycle time. Another approach is to implement a gradient descent optimization algorithm as discussed below.

Considering the two-dimensional trajectory examples of FIGS. 5B and 8, with all other conditions fixed (waypoint locations, fixed velocity states such as $V_{feed}$, and mechanical constraints of the robot or machine tool), it is recognized that the cycle time t of the trajectory of the complete multi-step operation is a function of the x and z velocity states at waypoint ②. That is, $t=F(V_{x,2}, V_{z,2})$, where t is the total cycle time of the trajectory from waypoint ⓪ to waypoint ②. If a three-dimensional graph were constructed of this function with the cycle time t on the vertical axis and the velocities $V_{x,2}$ and $V_{z,2}$ on the horizontal axes, it would be observed that the resulting plot surface has a bowl shape, concave upward. In other words, the cycle time t is at its minimum in the vicinity of some optimal combination of $V_{x,2}$ and $V_{z,2}$, and the cycle time t increases when either velocity ($V_{x,2}$, $V_{z,2}$ or both) moves away from the optimal value.

Figure 12:
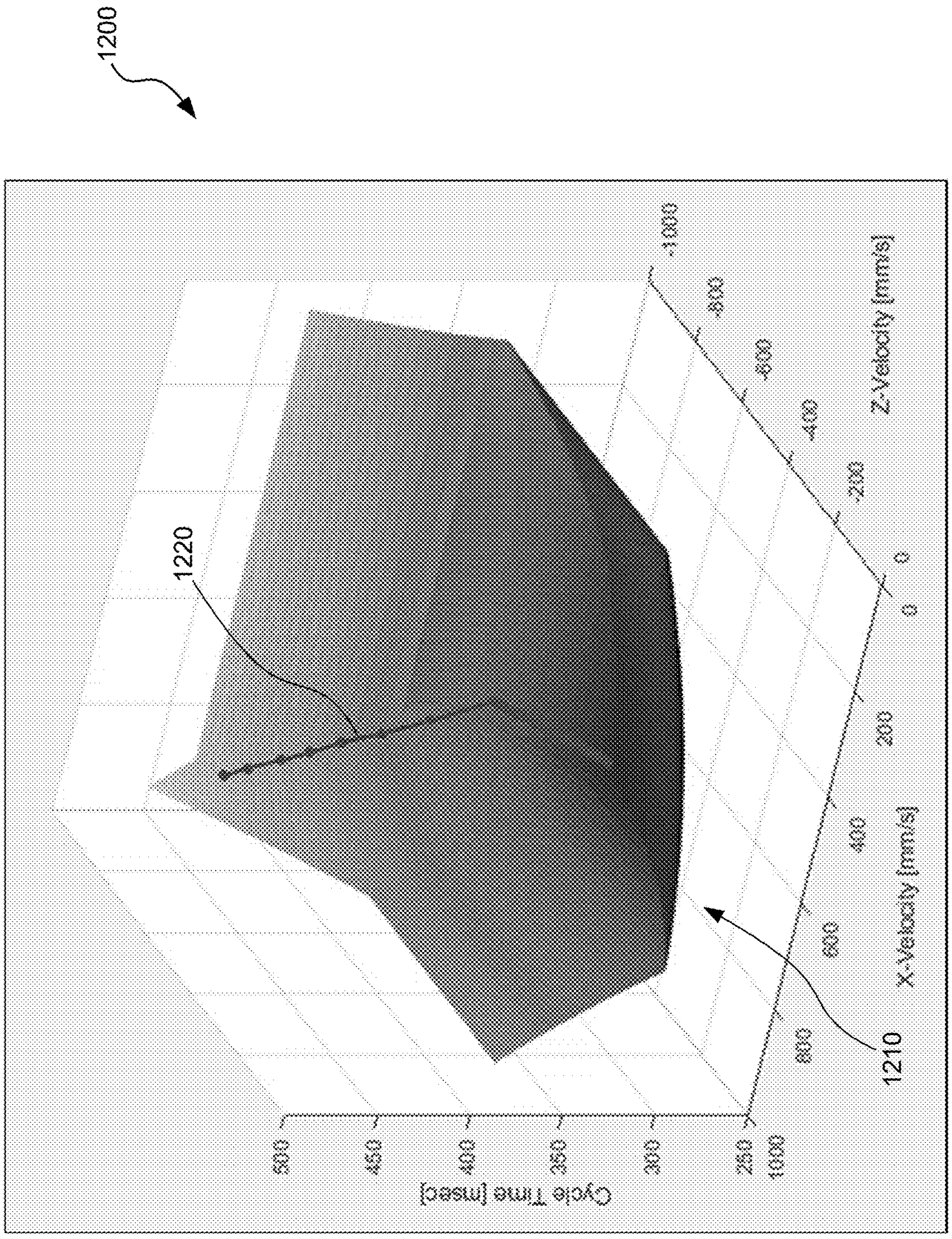
FIG. 12 is a three-dimensional graph of a function relating machining operation cycle time to velocity states for intermediate waypoints in a trajectory, illustrating how a gradient descent method is used to find optimal values of the velocities, according to an embodiment of the present disclosure.

FIG. 12 is a three-dimensional graph 1200 of a function relating machining operation cycle time to state velocities for an intermediate waypoint in a trajectory, illustrating how a gradient descent method is used to find optimal values of the velocities, according to an embodiment of the present disclosure. The graph 1200 is a plot of the function F described above, where the total trajectory cycle time t is plotted on a vertical axis relative to waypoint ② velocities on the horizontal axes, and a plot surface 1210 has the bowl shape described above.

One efficient method to find the minimum cycle time is using gradient descent. First, a computation algorithm is provided which generates a complete trajectory for the multi-step operation given waypoint velocity states. This is the calculation performed in the box 932 of FIG. 9. When the complete trajectory is generated (e.g., for all four steps of the motion of FIG. 8), the total cycle time t is the sum of the times of all of the trajectory segments.

Then, given the algorithm for computing total cycle time as a function of the velocities $V_{x,2}$ and $V_{z,2}$, the gradient descent method is used to iteratively evaluate the effect of the velocity vector ($v=[V_{x,2}, V_{z,2}]$) on cycle time, and follow the gradient toward lower cycle times. The first iteration uses a trajectory calculated with the initial estimates of the intermediate waypoint velocities, where the initial estimates are determined using the method of FIG. 11. Each subsequent iteration uses a trajectory calculated with the intermediate waypoint velocities which are determined from the gradient (discussed further below). The iteration continues until either the gradient converges to a predefined convergence criteria or a predefined maximum number of iterations is reached. The optimization path followed by the gradient descent method is shown as a curve 1220 in FIG. 12. The curve 1220 is idealized in that it follows two sections of smooth straight path to the optimal values of $V_{x,2}$ and $V_{z,2}$ (the minimum total cycle time t). In actuality, the curve 1220 may zig zag somewhat, and may hunt around near the bottom of the surface 1210, but it will converge to the optimal values if the surface 1210 is well-behaved.

While FIG. 12 depicts the gradient descent concept on a 3D graph which can be readily visualized, it will be recognized that the concept can be extended to additional dimensions. In particular, the time-optimal trajectory for a multi-step operation with an additional waypoint may have three variable intermediate waypoint velocity states ($V_{x,2}$, $V_{z,2}$ and $V_{exit}$) and the gradient descent technique can be applied to find a combination of all of these waypoint velocity states which results in a minimum total time to complete the multi-step operation. Implementation of the gradient descent method in a machine tool motion planning method is discussed below.

Figure 13:
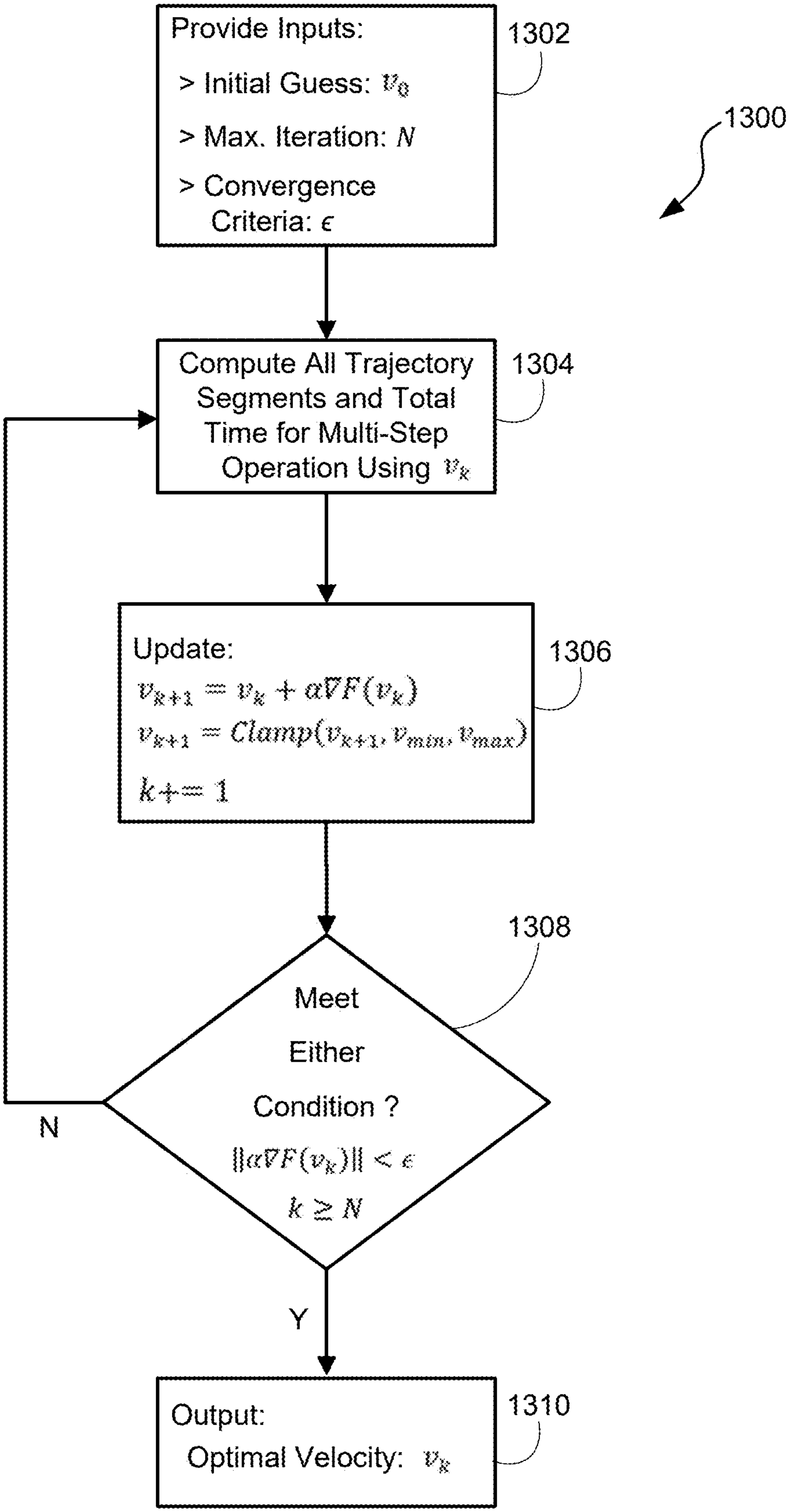
FIG. 13 is a flowchart diagram of a gradient descent method for optimizing velocity state values for intermediate waypoints used in time-optimal collision-free machine tool motion planning, according to an embodiment of the present disclosure.

FIG. 13 is a flowchart diagram 1300 of a gradient descent method for optimizing state boundary condition values for intermediate waypoints used in time-optimal collision-free machine tool motion planning, according to an embodiment of the present disclosure. The flowchart diagram 1300 of FIG. 13 is implemented in the optimization loop of the boxes 932-936 discussed above. In the example of FIG. 8, the gradient descent method is used to find optimal values of the x and z velocities at waypoint ②, along with $V_{exit}$. For the purposes of the gradient descent algorithm for this example, the velocity vector to be optimized is defined as $v=[V_{exit}, V_{x,2}, V_{z,2}]$.

Inputs to the gradient descent algorithm are provided at box 1302. The inputs include a maximum number of iterations and a convergence criteria $\in$, along with initial values $v_0$ of the variable waypoint state velocities ($V_{exit}$, $V_{x,2}$, $V_{z,2}$). The initial values of the variable waypoint state velocities may be provided as described above with respect to FIGS. 10 and 11.

At box 1304, the complete trajectory is generated for the multi-step operation using the initial waypoint state values $v_0$ for the first iteration (k is the iteration counter). An updated iteration of the velocity vector v is computed at box 1306 as:

$$v_{k+1} = v_k + \alpha\nabla F(v_k) \tag{1}$$

where $v_{k+1}$ is the updated iteration and $v_k$ is the previous iteration of the velocity vector v, α is a step size, and $\nabla F(v_k)$ is the gradient (∇) of the function F which relates time to the velocity vector (t=F(v)). The function F is evaluated at each iteration based on the total cycle time t. At each iteration, a local value of the gradient ∇ is established, and following iterations will use the value of the gradient to calculate a next iteration of the velocity vector ($v_{k+1}$) according to Equation (1). The updated velocity vector then is bounded by a clamp function:

$$v_{k+1} = \text{Clamp}(v_{k+1}, v_{min}, v_{max}) \in [v_{min}, v_{max}] \tag{2}$$

where $v_{min}$ and $v_{max}$ are the velocity limits defined by the system mechanical limitations or application requirements.

At decision diamond 1308, it is determined whether any termination criteria has been met. One termination criteria is if the amount of change in the velocity vector from one iteration to the next (computed by the norm of the term $\alpha\nabla(v_k)$) is less than the convergence criteria $\in$. If so, then the gradient descent calculation has converged to an optimum solution (minimum total cycle time t). Another termination criteria is if the number of iterations has reached the predefined maximum value.

From the decision diamond 1308, if the termination criteria have not been met, the process loops back to the box 1304 to compute another iteration of the velocity vector v, along with the corresponding trajectory and cycle time.

When one of the termination criteria is met, the process moves to box 1310 where the optimal value of the velocity vector ($v_k$, from the most recent iteration) is output, along with the corresponding time-optimal collision-free trajectory which was computed therefrom.

At this point, in the flowchart of FIG. 9, the process uses the computed trajectory from the last iteration of the gradient descent optimization and loops back to the box 922 to check for trajectory-obstacle collisions. In this case, the trajectory being used is the time-optimal collision-free trajectory computed (and optimized) at the box 932. At the decision diamond 924, if there is no trajectory-obstacle collision, the process ends at the terminus 926 and the time-optimal collision-free trajectory computed at the box 932 is used for the machining operation.

The gradient descent method for optimizing intermediate waypoint velocity states to minimize total time of a multi-step operation may also be applied in the looping between the boxes 608 and 612 of FIG. 6, which is a method for time-optimal trajectory computation of a multi-step operation without any additional waypoints.

As described with respect to FIGS. 2, 5B and 8, and elsewhere above, the complete tool motion program includes a combination of several steps—including both air cut and cutting steps. The techniques described above enable computation of non-static intermediate waypoint states which optimize the overall cycle time of the complete multi-step operation. This complete motion program is used by the controller of the robot or machine tool to control tool motion during the machining operation. The calculations of the flowchart of FIGS. 6, 9, 11 and 13 may be performed on the controller itself, or on another computer which then provides the computed motion programs to the controller.

In typical embodiments, where several machining operations are to be performed on each workpiece and the workpiece and the obstacle environment are fixed in position in a workspace, the time-optimal collision-free trajectory for each machining operation may be computed in advance using the disclosed methods, and the trajectories then used for performing the machining operation on many of the workpieces.

In addition to the benefits achieved by computing time-optimal trajectories for machining operations, there is also an opportunity to improve the machine tool programming method. The improved programming method simplifies the programming for the user and also enables time-optimal trajectories with non-static waypoints to be computed in the manner discussed above. Following is a discussion of a method for programming a machine tool motion plan which combines air cut and cutting commands into a single command, and uses program points defined directly on a workpiece surface. A tool path is automatically computed with a time-optimal trajectory which transitions from air cut to cutting without stopping and at specified cutting feed speed.

One example of the improvement opportunity for machining operation programming can be found in FIGS. 5A and 5B discussed earlier. FIG. 5A shows a traditional programming technique for a milling operation where a waypoint 512 (at the end of an aircut step and the beginning of a cutting step) is defined some distance off the workpiece 500, so that the cutting bit can accelerate from a standstill at the waypoint 512 to the cutting speed ($V_{feed}$) before reaching the workpiece 500. In contrast, FIG. 5B shows an improved programming technique for a milling operation where a waypoint 562 (an intermediate waypoint at the end of an aircut step and the beginning of a cutting step) is defined directly on the corner of the workpiece 550, where the aircut step trajectory is calculated so that the cutting bit arrives at the waypoint 562 with a horizontal velocity of the cutting speed ($V_{feed}$) and a vertical speed of zero.

The same concepts as illustrated for the milling operation of FIGS. 5A and 5B are also applicable to other types of machining operations such as drilling.

Figure 14A:
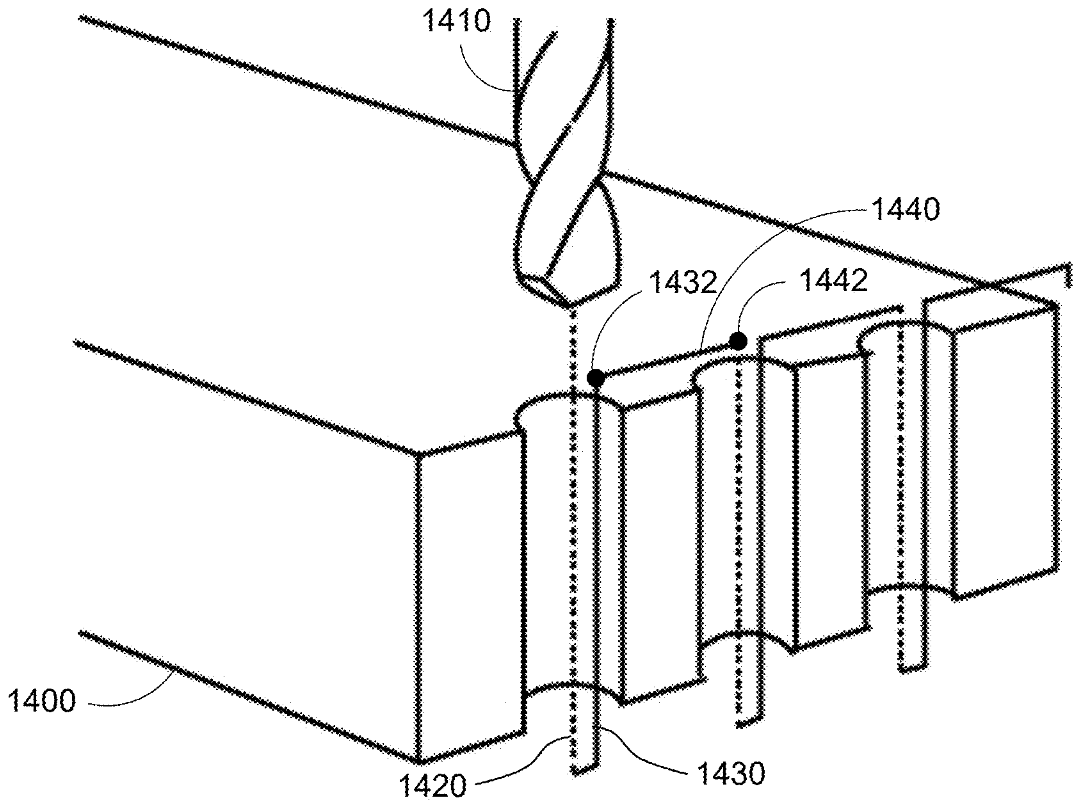
FIG. 14A is an illustration of a multi-step drilling operation performed using a traditional motion planning method.
Figure 14B:
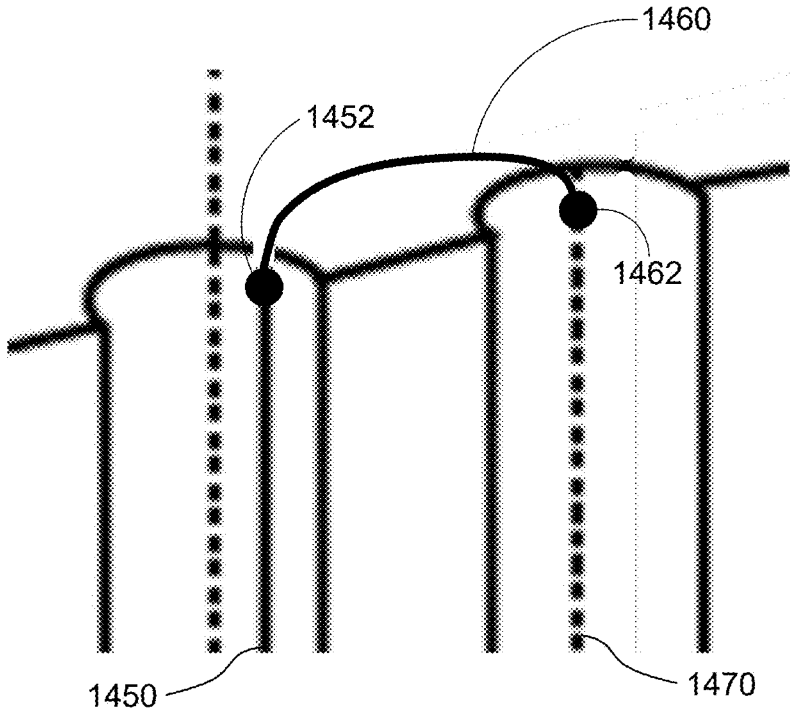
FIG. 14B is an illustration of a multi-step drilling operation performed using the time-optimal trajectory motion planning methods of the present disclosure.

FIG. 14A is an illustration of a multi-step drilling operation performed using a traditional motion planning method, and FIG. 14B is an illustration of a multi-step drilling operation performed using the time-optimal trajectory motion planning methods of the present disclosure. In FIG. 14A, a workpiece 1400 is to have multiple holes drilled into it by a cutting bit 1410. The cutting bit 1410 is shown positioned over the first hole to be drilled, with the second hole being to the right of the first hole, and so forth.

In the traditional programming method of FIG. 14A, the cutting bit 1410 first drills the first hole by following a trajectory step 1420 at cutting speed ($V_{feed}$). The cutting bit 1410 is then removed from the first hole by following a trajectory step 1430 in an air cut motion (as fast as possible using jerk-bound motion profile), and stopping at a waypoint 1432. The trajectory step 1430 actually follows the same path as the trajectory step 1420; the horizontal offset is shown for drawing illustration effect only. The dashed line of the trajectory step 1420 designates a cutting motion, while the solid line of the trajectory step 1430 designates an air cut motion.

From the waypoint 1432 (at a standstill), the cutting bit is then moved from the top of the first hole to the top of the second hole along a trajectory step 1440, which again is an air cut motion. The cutting bit 1410 stops at a waypoint 1442, which is some distance above the top of the workpiece 1400 to allow time and space for the cutting bit to accelerate from a standstill to reach the cutting speed ($V_{feed}$) before encountering the top of the workpiece 1400 on the next trajectory step.

In the time-optimal motion programming method of FIG. 14B, which is zoomed in to focus on the upper portions of the first two holes, after drilling the first hole, the cutting bit 1410 is removed from the first hole by following a trajectory step 1450 in an air cut motion (as fast as possible using jerk-bound motion profile), to a waypoint 1452. From the waypoint 1452 (remaining in motion), the cutting bit is then moved from the top of the first hole to the top of the second hole along a trajectory step 1460, which again is an air cut motion. When it reaches a waypoint 1462, which is at the same level as the top of the workpiece 1400, the cutting bit has a horizontal velocity of zero and a vertical velocity of $-V_{feed}$. The cutting bit 1410 then proceeds continuously into a trajectory step 1470 which is the drilling of the second hole.

In the traditional programming method, the tool is stopped at each waypoint, the trajectory for each motion step is computed individually, and waypoints preceding a cutting step must be defined some distance off the workpiece to allow time and space for the cutting bit to accelerate to cutting speed. In the improved time-optimal programming method, the tool is not stopped at intermediate waypoints, the trajectory for air cut steps is combined with at least one other step and a time-optimal multi-step trajectory is computed, and the waypoints are defined directly at the physical feature point on the workpiece (e.g., the top of a hole) rather than some artificial distance from the feature point.

Figure 15A:
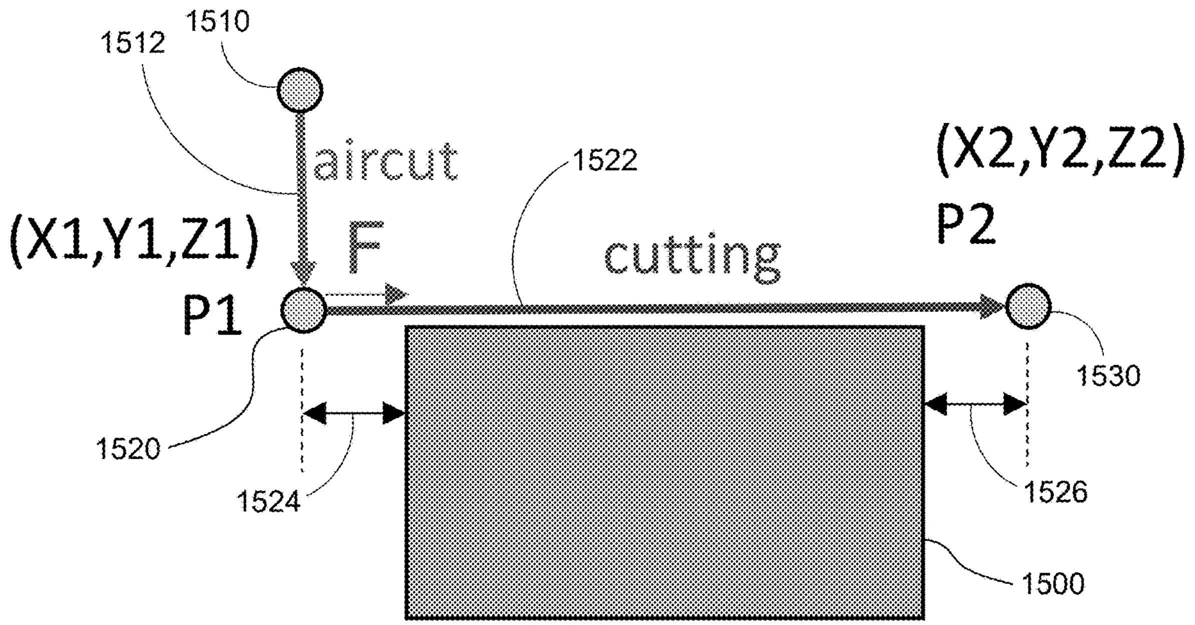
FIG. 15A is an illustration of a two-step machining operation performed using a traditional programming and motion planning method.
Figure 15B:
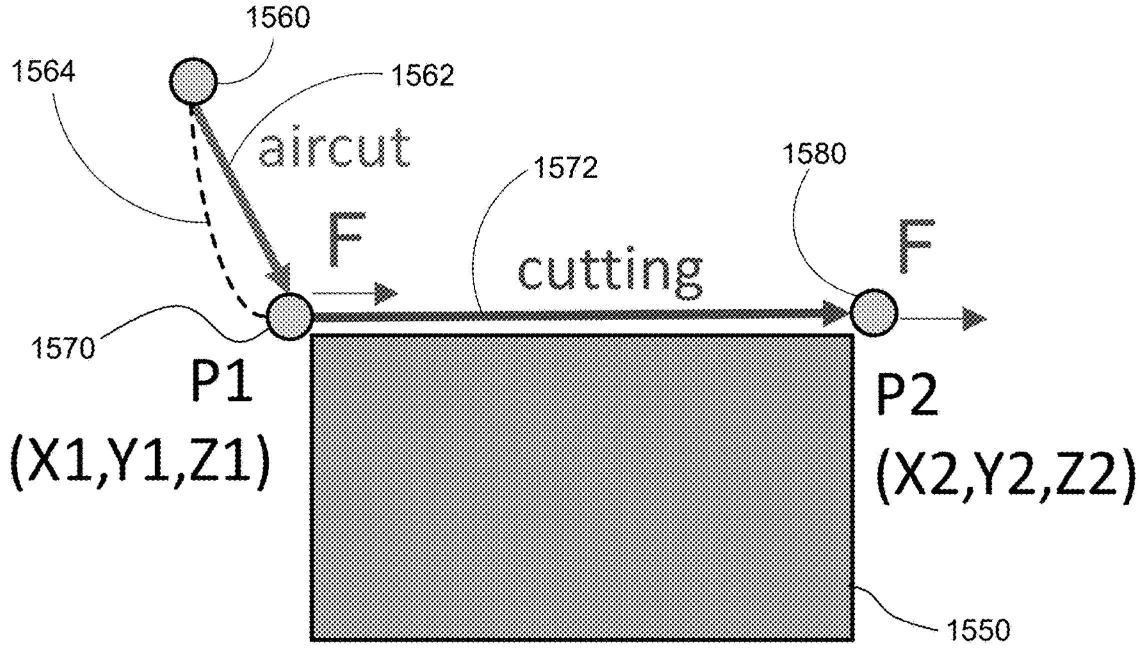
FIG. 15B is an illustration of a two-step machining operation performed using the improved programming and time-optimal trajectory motion planning methods of the present disclosure.

FIG. 15A is an illustration of a two-step machining operation performed using a traditional programming and motion planning method, and FIG. 15B is an illustration of a two-step machining operation performed using the improved programming and time-optimal trajectory motion planning methods of the present disclosure.

In FIG. 15A, a cutting bit (not shown) is to perform a machining operation on a workpiece 1500. The machining operation in this example is a milling operation—i.e., milling a small amount of material off of the top surface of the workpiece 1500. The cutting bit has a tool center point represented by waypoints 1510, 1520 and 1530. The two-step machining operation is to move the tool center point in an aircut step 1512 from a current location (the waypoint 1510) to a point P1 (the waypoint 1520) having coordinates (X1, Y1,Z1), and then move the tool center point in a cutting step 1522 from the then-current location (the waypoint 1520, P1) to a point P2 (the waypoint 1530) having coordinates (X2,Y2,Z2).

The traditional programming method requires the two-step operation to be programmed as two steps. The first step 1512 has a command format as follows, "ACT,X1, Y1,Z1", where "ACT" is the air cut command, and (X1,Y1,Z1) are the ending coordinates. The second step 1522 has a command format as follows, "CUT,X2, Y2,Z2,FF", where "CUT" is the cutting command, (X2,Y2,Z2) are the ending coordinates, and FF is the cutting speed (a.k.a., $V_{feed}$). In the traditional programming method, the tool center point stops at the waypoints 1520 and 1530, and the two steps have their trajectories computed separately. This requires that the point P1 (waypoint 1520) is defined some distance away from the workpiece 1500 to allow time and space for the tool to accelerate from a standstill up to cutting speed. This distance, indicated at arrow 1524, is part of the trajectory of the second step. A similar deceleration distance 1526 is required before the point P2 (waypoint 1530).

Techniques are known in the art for instructing the controller to overlap the first step 1512 with the second step 1522, thus preventing the tool from coming to a complete stop, and shortening the overall cycle time of the two-step operation. However, this type of overlap is difficult to control. For example, if the point P1 is defined too close to the corner of the workpiece 1500, the blended trajectory will still be moving vertically when it reaches the workpiece 1500. Furthermore, when overlap of adjacent steps is applied, the resulting blended trajectory will not pass through the prescribed waypoints.

The techniques of the present disclosure overcome the problems known to occur with existing methods, by combining programming steps into a single command and computing a multi-step trajectory which ensures that intermediate waypoint state boundary conditions are met.

In FIG. 15B, the cutting bit is to perform a machining operation on a workpiece 1550. The cutting bit has a tool center point represented by waypoints 1560, 1570 and 1580. The two-step machining operation is to move the tool center point in an aircut step 1562 from a current location (the waypoint 1560) to a point P1 (the waypoint 1570) having coordinates (X1,Y1,Z1), and then move the tool center point in a cutting step 1572 from the then-current location (the waypoint 1570, P1) to a point P2 (the waypoint 1580) having coordinates (X2,Y2,Z2). Using the improved programming method of FIG. 15B, the points P1 and P2 can be defined directly on the corner of the workpiece 1550, rather than some distance away from the workpiece as in the traditional method of FIG. 15A.

The improved programming method allows the two-step operation to be programmed as a single command. The command has a format as follows, "A_C,X1,Y1,Z1,X2,Y2,Z2,FF", where "A_C" is the command indicating air cut to a first waypoint followed by cutting to a second waypoint, and the waypoint coordinates and the cutting speed are defined as before. In the improved programming method, the tool center point does not stop at the waypoints 1570 and 1580, and the two steps have their trajectories computed simultaneously so that the tool center point reaches point P1 (the waypoint 1570) having the required states (in this example, zero vertical velocity, and horizontal velocity of FF (cutting speed).

The improved programming method of FIG. 15B simplifies programming for the user in two ways; it combines two commands (from the traditional method) into a single command, and it takes the guesswork out of defining the locations of P1 and P2 (which can now be defined at the actual feature point on the workpiece). In addition, the improved programming method computes an integrated trajectory for the two-step operation which has a shorter total time than the two-step trajectory of the traditional method. This is because the first step actually follows a trajectory path shown by dashed line 1564, arriving at the waypoint 1570 with the proper velocity states for the cutting step 1572, while the cutting step 1572 does not have unnecessary extra distance added to it as did the cutting step 1522 of FIG. 15A.

FIG. 15B illustrates a simple two-dimensional example where the cutting step 1572 has a trajectory which moves entirely in a single coordinate direction (X), which means that for this entire step (from P1 to P2), the vertical velocity is zero and the horizontal velocity $V_x = V_{feed}$. In real world examples, a cutting step may have any arbitrary orientation in a workcell coordinate frame. This can be handled by computing the velocity in each coordinate axis direction during a cutting step as the cutting speed "FF" multiplied by the proportion of the displacement along the axis for the cutting step. This is computed as follows:

$$F_i = FF \cdot \frac{|\Delta P_i|}{\|P2 - P1\|} \cdot e_i \text{ for } i = X, Y, Z \tag{3}$$

where $F_i$ is the component of velocity in the i direction (e.g., X direction), FF is the absolute cutting feed speed mentioned earlier, $|\Delta P_i|$ is the magnitude of the incremental displacement from P1 to P2 in the i direction, $\|P2-P1\|$ is the total 3D distance from P1 to P2, and $e_i$ is the unit vector for the i direction.

The command "A_C" is of course simply an example of a programming command, and an actual machine tool programming language may use any suitable command format. A command such as "C_A" may be used for the opposite sequence—that is, a cutting step followed by an air cut step. Furthermore, a command such as "A_A" may be used for a sequence of two air cut steps, such as the example shown in FIG. 14B where the drill bit is extracted from the hole in an air cut step and then repositioned above the next hole in another air cut step. This example requires the trajectory to pass through the waypoint 1452, but allows flexibility to optimize the vertical velocity of the bit as it exits the hole in order to minimize overall trajectory time.

In all of these cases, fewer command lines of programming are needed, no artificial waypoint locations need to be approximated, and the resulting combined trajectory is faster than the multiple steps of the traditional programming method. Comparison of the improved motion programming method with the traditional method—in examples including the multi-step drilling operation of FIGS. 14A/14B and the multi-step milling operation of FIGS. 15A/15B—resulted in a faster cycle time using the improved programming command technique and its combined multi-step trajectory.

The combination of multiple steps into a single programming command and the corresponding computation of a time-optimal multi-step trajectory can also be applied to face milling operations. This example is discussed below.

Figure 16A:
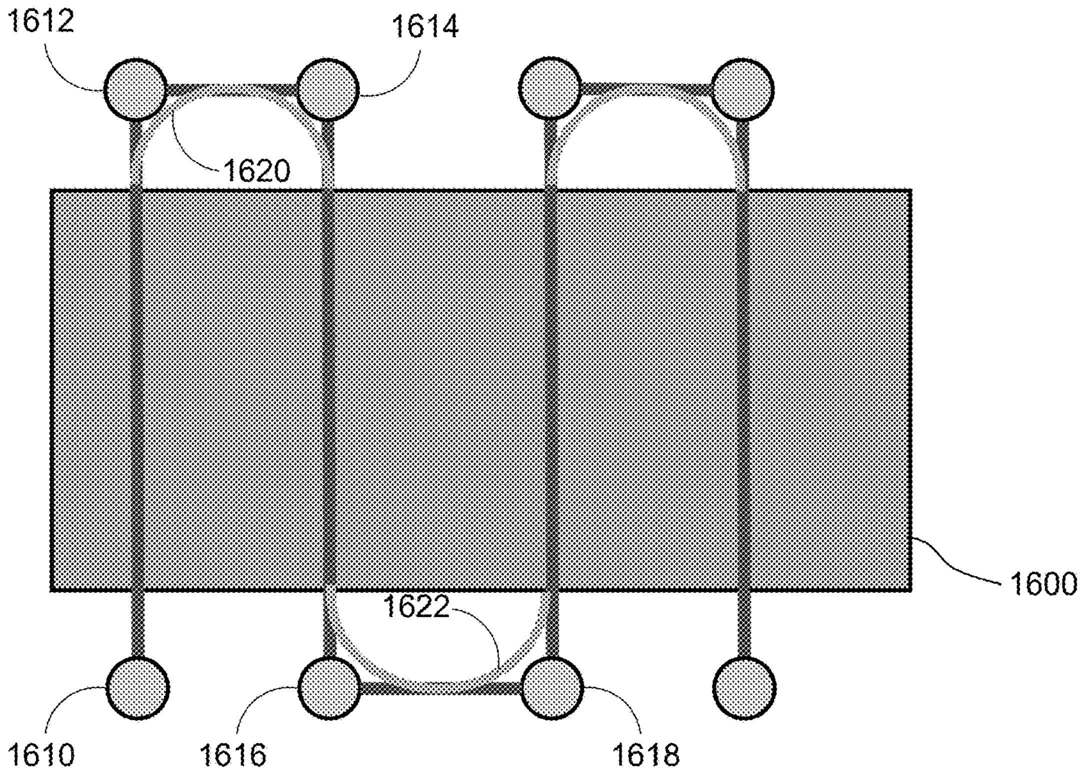
FIG. 16A is an illustration of a multi-pass milling operation performed using a traditional programming and motion planning method.
Figure 16B:
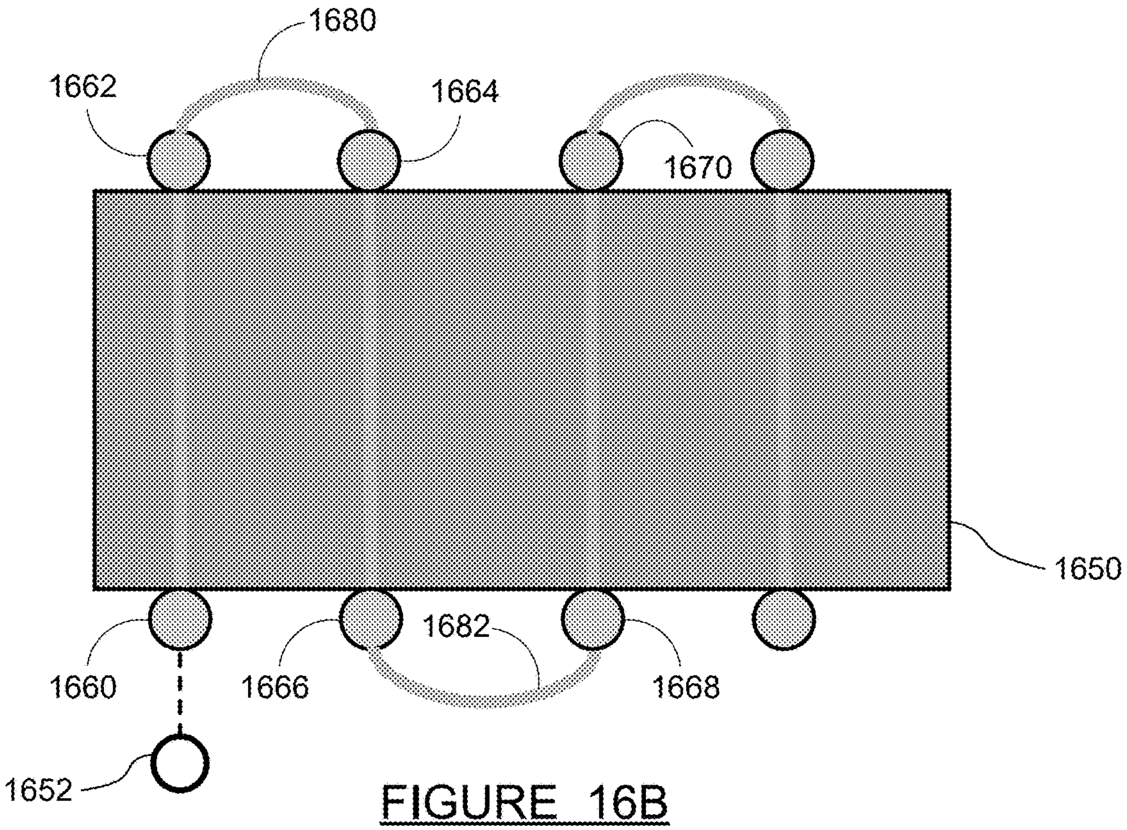
FIG. 16B is an illustration of a multi-pass milling operation performed using the improved programming and time-optimal trajectory motion planning methods of the present disclosure.

FIG. 16A is an illustration of a multi-pass milling operation performed using a traditional programming and motion planning method, and FIG. 16B is an illustration of a multi-pass milling operation performed using the improved programming and time-optimal trajectory motion planning methods of the present disclosure.

In FIG. 16A, a cutting bit (not shown) is to perform a multi-pass machining operation on a workpiece 1600, where the cutting bit makes repeated cutting passes across the workpiece 1600, each pass offset from the previous by a certain distance. As shown in FIG. 16A, the cutting bit must follow a trajectory including a turnaround following each pass. The cutting bit has a tool center point represented by waypoints 1610, 1612, 1614, 1616, 1618, etc. From the waypoint 1610, a cutting step is performed to the waypoint 1612; this cutting step requires the waypoints to be defined some distance off the workpiece 1600, to allow time and space for acceleration and deceleration, as discussed earlier. The tool center point stops at the waypoint 1612, then performs an air cut to the waypoint 1614 according to another command. The air cut is performed using a jerk-bound rapid acceleration/deceleration as also discussed earlier. The cutting step and air cut step are repeated in sequence to the waypoints 1616, 1618, etc., until the entire machining operation is completed.

In the traditional programming and trajectory calculation method of FIG. 16A, each cutting step and each air cut step is a separate command, and the tool center point stops at each waypoint. An overlap function may be used, as known in the art, to blend two trajectory segments together, resulting in the curved turnaround segments 1620 and 1622, etc. However, the overlap still requires the waypoints to be defined off the workpiece surface, and the offset distance must be estimated by the programming user. If the chosen waypoint offset distance is too small, the tool center point path will begin curving before cutting of the workpiece material has finished, thereby ruining the workpiece. If the chosen waypoint offset distance is too large, the tool center point will travel an unnecessarily long distance in the turnaround, and some of that distance will be at slow cutting speed.

In FIG. 16B, the cutting bit is to perform a multi-pass machining operation on a workpiece 1650, similar to that described above, where the cutting bit makes repeated passes across the workpiece 1650, each pass offset from the previous by a certain distance. As shown in FIG. 16B, the cutting bit must follow a trajectory including a turnaround following each pass. The cutting bit has a tool center point represented by waypoints 1660, 1662, 1664, 1666, 1668, etc. The waypoints (waypoints 1660, 1662, etc.) are defined at the actual feature points on the geometry of the workpiece 1650, rather than some offset distance away as in the traditional method of FIG. 16A. A starting point 1652 is defined off the workpiece 1650; this is the staging location where the cutting bit begins.

In the improved programming and time-optimal trajectory calculation method of FIG. 16B, air cut and cutting steps can be combined into a single command, and a time-optimal trajectory for the multiple steps computed. Beginning from the starting point 1652, a single command is written which dictates an air cut at maximum possible speed (jerk-bound acceleration profile) to the 3D coordinates of the waypoint 1660, followed by a cutting operation from the waypoint 1660 to the 3D coordinates of the waypoint 1662 at a cutting speed “FF”. This type of command was detailed earlier in connection with FIG. 15B. As discussed then, the combined command computes a trajectory which reaches the waypoint 1660 at the cutting speed, without stopping.

A next command in the machining operation program would be, from the waypoint 1662, an air cut to the waypoint 1664 followed by a cutting operation from the waypoint 1664 to the waypoint 1666. Because the cutting bit reaches the waypoint 1662 at cutting speed, and the upcoming air cut/cutting command dictates that the bit reaches the waypoint 1664 at cutting speed, the resulting trajectory from waypoint 1662 to waypoint 1664 will have the shape indicated at 1680. From the waypoint 1666 at cutting speed, another combination air cut/cutting command is provided to the waypoint 1668 and on to a waypoint 1670, resulting in the trajectory shape indicated at 1682. This type of sequence continues until the machining operation is fully defined in the program.

The improved programming method of FIG. 16B results in significantly fewer lines of programming (4) compared to the traditional method (7), and the resulting time-optimal trajectory is significantly shorter in cycle time than the station-to-station traditional technique. In addition, the improved programming method allows waypoints to be defined directly on the feature points of the workpiece, rather than at some distance off the workpiece which must be guessed at and tested.

One skilled in the art can envision other programming commands which combine more than two steps into a single command line. In fact, the entire multi-pass machining operation of FIG. 16B could be programmed in a single line, with a command which dictates an alternating sequence of air cut and cutting steps, and a sequential listing of the coordinates of the waypoints 1660, 1662, 1664, 1666, 1668, etc.

Figure 17:
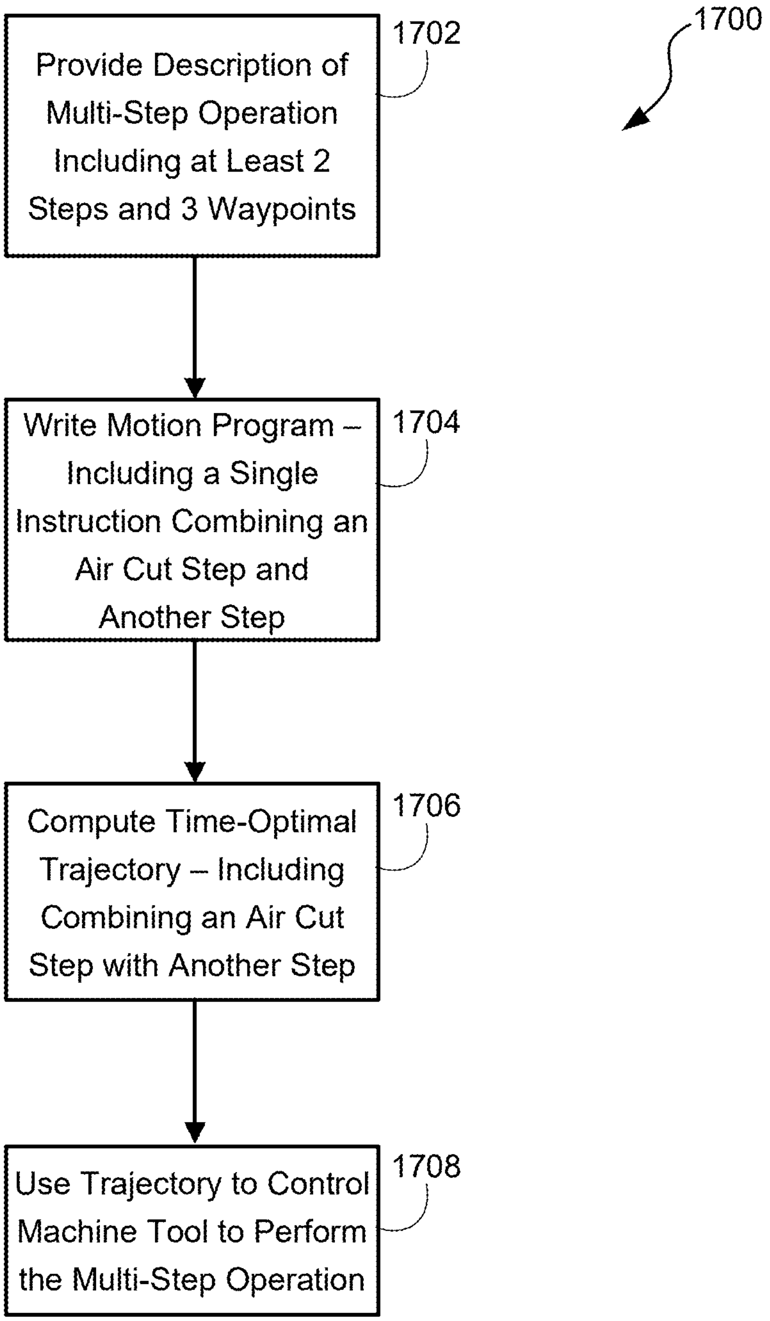
FIG. 17 is a flowchart diagram of an improved method for programming a machine tool, combining an air cut step with another air cut or cutting step into a single program command, according to an embodiment of the present disclosure.

FIG. 17 is a flowchart diagram 1700 of an improved method for programming a machine tool, combining an air cut step with another air cut or cutting step into a single program command, according to an embodiment of the present disclosure.

At box 1702, a description of a multi-step operation is provided, including at least two steps and three waypoints. The information provided at the box 1702 is what needs to be known by a programmer to create a machine tool motion program. For example, this would include the 3D coordinates of the top and bottom of a hole to be drilled, or the 3D coordinates of the beginning and ending points of a milling pass (e.g., points P1 and P2 of FIG. 15B), along with the cutting or feed speed. A “current” location of the tool center point serves as the third waypoint—that is, the beginning point of the first step—although the current location need not be listed explicitly.

At box 1704, a motion program is written by a user, including writing a single command combining an air cut step and another step, where the other step may be either an air cut or cutting step. When an air cut and cutting step are combined in a single command, they may appear in either order (i.e., air cut first, or cutting first), as necessitated by the requirements of the machining operation. The programming command includes a command type which specifies the sequence of steps (e.g., air cut step followed by cutting step), 3-D coordinates of a first waypoint, 3-D coordinates of a second waypoint, and a cutting feed speed. Examples of commands defining a two-step operation were provided previously, in the discussion of FIG. 15B for example.

At box 1706, a time-optimal trajectory is computed, by a computing device such as the machine controller or a separate computer. The time-optimal trajectory is computed in the manner discussed extensively above—including calculating a trajectory for the combined two-step operation, where the states of the intermediate waypoint (the waypoint joining the first step to the second step) are optimized to yield the shortest total cycle time. All of this was discussed earlier, including using optimization techniques such as gradient descent to identify the optimal values of intermediate waypoint states.

At box 1708, the time-optimal trajectory is used by the machine controller to control the machine tool to perform the multi-step operation. Typically, several operations are contained in a single machine tool motion program, and a complete motion program may contain several of the combined two-step operation commands, along with other commands.

The time-optimal machine tool motion programming method of the present disclosure provides several advantages over traditional programming methods. The time-optimal programming method allows waypoints to be defined directly at the physical feature point on the workpiece, does not stop the tool at intermediate waypoints, and combines air cut steps with other steps to compute a time-optimal multi-step trajectory. The resulting programming format is more intuitive for the programming user, and enables combination of trajectory steps to reduce the overall cycle time.

Throughout the preceding discussion, various computers and controllers are described and implied. It is to be understood that the software applications and modules of these computers and controllers are executed on one or more electronic computing devices having a processor and a memory module. In particular, this includes the machine controller and/or the optional other computer discussed above. Specifically, the processor in the controller or the other computer is configured to perform the time-optimal machine tool motion planning described above, including the method steps of FIGS. 6, 9, 11, 13 and 17, and the equations and other techniques described above.

While a number of exemplary aspects and embodiments of the methods for time-optimal machine tool motion planning and programming have been discussed above, those of skill in the art will recognize modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method for machine tool motion planning, said method comprising:

providing input data for a machining operation, including geometry of a workpiece and at least one feature to be machined in or on the workpiece by a machine tool, a machining feed speed and machine tool limits including a maximum velocity, acceleration and jerk;

defining waypoints for a multi-step motion plan for the machining operation, including start and end waypoints for at least two steps, with at least one intermediate waypoint including an intermediate waypoint in common to any two adjoining steps, where at least one of the steps is an air-cut step having flexibility in trajectory shape and speed;

generating a trajectory for the multi-step motion plan in which the at least one intermediate waypoint has a non-stationary state, by a computing device having a processor and memory, including computing a trajectory profile and a time span for each step of the multi-step motion plan, where a total time is a sum of the time span for all of the steps;

calculating one or more states of the at least one intermediate waypoint, where computing the trajectory profile and the time span for each step of the multi-step motion plan includes computing a motion profile in each of at least two coordinate directions for each of the air-cut steps, where the motion profiles are computed using equations for a seven-phase jerk-bound motion, the one or more states of the at least one intermediate waypoint, the machine tool limits and starting and ending boundary conditions for the multi-step motion plan; and using the trajectory to perform the machining operation by the machine tool.

2. The method according to claim 1 wherein the non-stationary state of the at least one intermediate waypoint includes a velocity state.

3. The method according to claim 2 wherein generating the trajectory for the multi-step motion plan includes computing an initial estimate of the velocity state of each intermediate waypoint, including calculating the initial estimate of the velocity state based on a distance traveled in a step of the multi-step motion plan, a velocity state at an opposite end of the step from the intermediate waypoint, and the machine tool limits.

4. The method according to claim 1 wherein one of the steps of the multi-step motion plan is a cutting step with defined boundary conditions including locations of beginning and ending waypoints, trajectory shape for the step and a velocity for the step being equal to the feed speed.

5. The method according to claim 1 wherein calculating one or more states of the at least one intermediate waypoint includes iteratively revising the one or more states and generating a new trajectory for the multi-step motion plan until states are found which result in the trajectory having a minimum total time.

6. The method according to claim 5 wherein iteratively revising the one or more states and generating the new trajectory for the multi-step motion plan includes using a gradient descent method to identify the one or more states of the at least one intermediate waypoint which result in the minimum total time.

7. The method according to claim 1 further comprising adding one or more new waypoints to one of the air-cut steps of the multi-step motion plan and generating a trajectory for a revised motion plan including the one or more new waypoints, where the one or more new waypoints have variable non-stationary states.

8. The method according to claim 7 wherein generating the trajectory for the revised motion plan includes computing a first trajectory segment from an origin waypoint of the air-cut step to the one or more new waypoints and a second trajectory segment from the one or more new waypoints to a destination waypoint of the air-cut step.

9. The method according to claim 7 wherein generating the trajectory for the revised motion plan includes optimizing the states of the one or more new waypoints and the at least one intermediate waypoint to provide the trajectory for the revised motion plan having a minimum total time.

10. The method according to claim 9 wherein optimizing the states of the one or more new waypoints and the at least one intermediate waypoint includes using a gradient descent method to identify the states of the one or more new waypoints and the at least one intermediate waypoint which result in the minimum total time for the revised motion plan.

11. The method according to claim 7 wherein the one or more new waypoints are added to avoid an interference between the trajectory and an obstacle, where the obstacle is a physical object or a mathematically-defined interference zone into which entry by the machine tool is prohibited.

12. The method according to claim 11 wherein adding the one or more new waypoints includes computing a critical point at a location nearest one of the waypoints where the trajectory interferes with the obstacle, and computing a location of the one or more new waypoints which is offset from the critical point and outside the obstacle.

13. The method according to claim 12 further comprising computing initial estimates of the non-stationary states of the one or more new waypoints.

14. The method according to claim 1 wherein the machine tool is a multi-axis industrial robot or a multi-axis numerically-controlled machine.

15. The method according to claim 1 wherein the machining operation is drilling one or more holes in the workpiece and the waypoints are top and bottom points on a centerline of the one or more holes, or the machining operation is milling one or more passes across the workpiece and the waypoints are beginning and ending points on a centerline of the one or more passes.

16. A method for machine tool motion planning, said method comprising:

providing input data for a machining operation, including geometry of a workpiece and at least one feature to be machined in or on the workpiece by a machine tool, a machining feed speed and machine tool limits including a maximum velocity, acceleration and jerk;

defining waypoints for a multi-step motion plan for the machining operation, including start and end waypoints for two steps, with an intermediate waypoint being a waypoint in common to the two steps, where one of the steps is an air-cut step having flexibility in trajectory shape and speed and the other step is either another air-cut step or a cutting step with defined and unchangeable boundary conditions;

computing an initial estimate of a non-stationary state of the intermediate waypoint, including calculating the initial estimate of the state based on a distance traveled in an air-cut step of the multi-step motion plan, a state at an opposite end of the air-cut step from the intermediate waypoint, and the machine tool limits;

generating a trajectory for the multi-step motion plan, by a computing device including a processor and memory, including computing a trajectory profile and a time span for each step of the multi-step motion plan, where a total time is a sum of the time span for all of the steps;

calculating the state of the intermediate waypoint , where computing the trajectory profile and the time span for each step of the multi-step motion plan includes computing a motion profile in each of at least two coordinate directions for each of the air-cut steps, where the motion profiles are computed using equations for a seven-phase jerk-bound motion, the state of the intermediate waypoint, the machine tool limits and starting and ending boundary conditions for the multi-step motion plan; and using the trajectory to perform the machining operation by the machine tool.

17. The method according to claim 16 wherein calculating the state of the intermediate waypoint includes iteratively revising the state and generating a new trajectory for the multi-step motion plan until a state is found which results in the trajectory having the minimum total time.

18. The method according to claim 16 further comprising adding one or more new waypoints to one of the air-cut steps of the motion plan and generating a trajectory for a revised motion plan including the one or more new waypoints, where the one or more new waypoints have variable non-stationary states, including computing a first trajectory segment from an origin waypoint of the air-cut step to the one or more new waypoints and a second trajectory segment from the one or more new waypoints to a destination waypoint of the air-cut step.

19. The method according to claim 18 wherein generating the trajectory for the revised motion plan includes computing initial estimates of the states of the one or more new waypoints, then optimizing the states of the one or more new waypoints and the intermediate waypoint to provide the trajectory for the revised motion plan having a minimum total time.

20. The method according to claim 18 wherein the one or more new waypoints are added to avoid an interference between the trajectory and an obstacle, where adding the one or more new waypoints includes computing a critical point at a location nearest one of the waypoints where the trajectory interferes with the obstacle, and computing a location of the one or more new waypoints which is offset from the critical point and outside the obstacle.

* * * * *